(12) United States Patent
Pak et al.

(10) Patent No.: US 8,333,948 B2
(45) Date of Patent: Dec. 18, 2012

(54) CARBON NANOTUBE FOR FUEL CELL, NANOCOMPOSITE COMPRISING THE SAME, METHOD FOR MAKING THE SAME, AND FUEL CELL USING THE SAME

(75) Inventors: Chan-Ho Pak, Seoul (KR); Hyuk Chang, Gyeonggi-do (KR); Sungho Jin, San Diego, CA (US); Xiang-Rong Ye, San Diego, CA (US); Li-Han Chen, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 459 days.

(21) Appl. No.: 11/664,766

(22) PCT Filed: Oct. 6, 2005

(86) PCT No.: PCT/KR2005/003311
§ 371 (c)(1),
(2), (4) Date: Nov. 5, 2008

(87) PCT Pub. No.: WO2006/080702
PCT Pub. Date: Aug. 3, 2006

(65) Prior Publication Data
US 2009/0075157 A1  Mar. 19, 2009

Related U.S. Application Data

(60) Provisional application No. 60/616,708, filed on Oct. 6, 2004.

(51) Int. Cl.
*D01F 9/127* (2006.01)
*C01B 31/00* (2006.01)
*H01M 4/00* (2006.01)
*H05H 1/24* (2006.01)
*B32B 37/00* (2006.01)

(52) U.S. Cl. ............... 423/447.3; 204/155; 204/157.47; 977/742; 977/843; 977/847; 977/848; 429/530; 427/577; 156/150; 156/273.1

(58) Field of Classification Search .... 423/447.1–447.3, 423/445 B; 977/742–754, 842–848; 428/367; 429/44; 427/577; 156/273.1, 150; 204/155, 204/157.47
See application file for complete search history.

(56) References Cited

U.S. PATENT DOCUMENTS

| | | | | |
|---|---|---|---|---|
| 7,585,584 | B2 * | 9/2009 | Choi et al. | 429/524 |
| 8,083,905 | B2 * | 12/2011 | Choi et al. | 204/157.47 |
| 2002/0177032 | A1 * | 11/2002 | Suenaga et al. | 429/44 |
| 2004/0018416 | A1 * | 1/2004 | Choi et al. | 429/44 |

(Continued)

OTHER PUBLICATIONS

Bower, et al., Plasma-induced alignment of carbon nanotubes, Applied Physics Letters 2000; 77(6): 830-832.*

(Continued)

*Primary Examiner* — Daniel C. McCracken
(74) *Attorney, Agent, or Firm* — Sanford Astor; Brooks Kushman P.C.

(57) ABSTRACT

Provided are aligned carbon nanotubes for a fuel cell having a large surface area, a nanocomposite that includes the aligned carbon nanotubes loaded with highly dispersed nanoparticles of a metallic catalyst, methods of producing the carbon nanotubes and the nanocomposite, and a fuel cell including the nanocomposite. In the nanocomposite, nanoparticles of the metallic catalyst are uniformly distributed on external walls of the nanotubes. A fuel cell including the nanocomposite exhibits better performance.

4 Claims, 24 Drawing Sheets

U.S. PATENT DOCUMENTS

2010/0018851 A1* 1/2010 Choi et al. ............... 204/157.43

OTHER PUBLICATIONS

Satishkumar, et al., The decoration of carbon nanotubes by metal nanoparticles, J. Phys. D: Appl. Phys. 1996; 29: 3173-3176.*

Choi, et al., Spontaneous Reduction of Metal Ions on the Sidewalls of Carbon Nanotubes, J. Am. Chem. Soc. 2002; 124(31): 9058-9059.*

Ang, et al., Decoration of activated carbon nanotubes with copper and nickel, Carbon 2000; 38: 363-372.*

Rodriguez, et al., Carbon Nanofibers: A Unique Catalyst Support Medium, J. Phys. Chem. 1994; 98: 13108-13111.*

Li et al; Preparation and Characterization of Multiwalled Carbon Nanotube-Supported Platinum for Cathode Catalysts of Direct Methanol Fuel Cells; J.Phys. Chem., 2003, V107.

Wang et al; Proton Exchange Membrane Fuel Cells with Carbon Nanotube Based Electrode; Nano Letters; 2004; vol. 4, p. 345.

Bower et al; Plasma-Induced Alignment of Carbon Nanotubes; Applied Physics Letters; 2000; vol. 77; p. 830.

Aubuchon et al; Multiple Sharp Bendings of Carbon Nanotubes During Growth to Produce Zigzag Morphology; Nano Letters; 2004; vol. 4, p. 1781.

Shen; Synthetic Macroporous Silicas with Multilamellar Structure; J. Phys. Chem.; 2004; vol. B 108; p. 44.

Kanungo et al; Fabrication of Two-Dimensionally Ordered Macroporous Silica Materials with Controllable Dimensions; Chem. Communications; 2004; p. 548.

* cited by examiner

CARBON NANOTUBE FOR FUEL CELL, NANOCOMPOSITE COMPRISING THE SAME, METHOD FOR MAKING THE SAME, AND FUEL CELL USING THE SAME

CROSS-REFERENCE TO RELATED PATENT APPLICATIONS

This application claims the benefit of U.S. Patent Application No. 60/616,708, filed on Oct. 6, 2004, in the US Intellectual Property With respect to ice, the disclosure of which is incorporated herein in its entirety by reference.

BACKGROUND OF THE INVENTION

1. Field of the Invention

The present invention relates to carbon nanotubes for a fuel cell, a nanocomposite including the same, methods of manufacturing the carbon nanotubes and the nanocomposite, and a fuel cell, and more particularly, to carbon nanotubes for a fuel cell to which highly-dispersed nanoparticles of a metallic catalyst are adhered, a nanocomposite including the same, and a fuel cell including the nanocomposite.

2. Description of the Related Art

Recently, with growing concerns about the environmental effects of fossil fuels and the eventual exhaustion of available energy resources, the design and fabrication of fuel cells have received a lot of attention for potential applications such as automobiles and consumer electronics devices.

Fuel cells are new energy conversion devices that transform energy stored in a fuel into electricity through electrochemical reactions of fuel and oxidative gas.

They can be classified into solid oxide electrolyte fuel cells using solid oxide electrolyte, which can be operated at 1000° C.; molten carbonate salt fuel cells, which can be operated at 500-700° C.; phosphoric acid electrolyte fuel cells, which can be operated at about 200° C.; and alkaline electrolyte fuel cells and solid polymer electrolyte fuel cells, which can be operated at an ambient temperature or at a temperature of about 110° C. or less.

Examples of solid electrolyte fuel cells include proton-exchange membrane fuel cells (PEMFCs) utilizing hydrogen gas as a fuel source, direct methanol fuel cells (DMFCs) which generate power using liquid methanol solution directly applied to an anode as a fuel source, and the like. Polymer electrolyte fuel cells are clean energy sources, can replace fossil fuels, and have high power density and high-energy conversion efficiency. In addition, polymer electrolyte fuel cells can operate at an ambient temperature, and can be miniaturized and sealed. These characteristics make polymer electrolyte fuel cells a desirable choice for pollution-free vehicles, power generating systems for home use, portable telecommunications equipment, military equipment, medical equipment, space technology equipment, and the like.

PEMFCs produce a direct current through the electrochemical reaction of hydrogen and oxygen, and contain a proton-exchange membrane interposed between an anode and a cathode.

The proton-exchange membrane is formed of a solid polymer material with good proton conducting properties and minimal cross-over of unreacted gas to the cathode part, such as Nafion. The anode and the cathode include backing layers for supplying reaction gases or liquid, and a catalyst for the oxidation/reduction of reaction gases.

As hydrogen reaction gas is supplied to the PEMFC, hydrogen molecules are decomposed into protons and electrons through oxidation reaction in the anode. These protons permeate across the proton-exchange membrane to the cathode.

Meanwhile, oxygen is supplied to the cathode, and accept electrons forming oxygen ions. These oxygen ions then combine with the protons from the anode to produce water.

A gas diffusion layer (GDL) in the PEMFC is included in the anode and the cathode. The catalyst layer promoting the fuel cell chemical reactions is formed on the anode and cathode backing layers. The anode and cathode backing layers can be formed of carbon cloth or carbon paper.

The direct methanol fuel cells (DMFCs) have a similar assembly structure to the PEMFC described above, but use liquid methanol solution instead of hydrogen as a fuel source. As methanol solution is supplied to the anode, an oxidation reaction occurs in the presence of a catalyst to generate protons, electrons, and carbon dioxide. Although DMFCs exhibit somewhat lower energy efficiency than PEMFCs, the use of a liquid fuel in DMFCs makes their application to portable electronic devices easier.

In order to increase power density and voltage by increasing energy density of a fuel cell, research has been conducted into electrodes, fuels, and electrolyte membranes. In particular, many attempts have been made to increase catalyst activity in electrodes. Typically, the catalyst used in PEMFCs and DMFCs is Pt, Pd, Rh, Ru, or an alloy of Pt and other metals, and a smaller amount of the metallic catalyst is required to decrease manufacturing costs.

The catalyst amount can be decreased while the performance of a fuel cell is maintained or increased. In such a method, a conductive carbonaceous material having a large specific surface area is used as a support and nanoparticles of Pt or the like are dispersed, thereby increasing a specific surface area of the metallic catalyst.

Conventionally, a catalyst such as Pt has been applied as a paste, uniformly onto a porous carbon backing substrate.

However, the dispersion of the catalyst in the backing substrate is not uniform, and the surface area and electrical conductivity of the carbon backing substrate are not large enough. As carbon nanotubes have many attractive physical properties such as good electrical conductivity, superior mechanical strength, high aspect ratio, and large surface-to-volume ratio, various attempts have been made to utilize carbon nanotubes as the fuel cell electrodes (see articles by Li, et al., Journal of Physical Chemistry, Vol. 107, page 6292 (2003); and by Wang, et al., Nano Lett. Vol. 4, page 345 (2004).)

U.S. Pat. No. 6,589,682 discloses the use of carbon nanotubes as a nanoscale gas diffusion layer in the membrane electrode assembly of a fuel cell in order to improve the gas conversion efficiency, electrical conduction, and enhance resistance to mechanical crushing.

The use of high specific surface area of the nanotubes for enhanced catalyst availability is, however, not discussed in this patent.

US Patent Application No. 2004/0018416A discloses a chemical vapor deposition (CVD) method for growing carbon nanotubes on carbon paper for a fuel cell.

However, the use of fuel cell catalyst particles, such as Pt or Ru, and carbon nanotube nucleating catalyst particles is not clearly explained in the application.

In addition, the nanotubes disclosed in the 0018416A patent application are randomly oriented nanotubes, not directionally aligned nanotubes. Random oriented nanotubes tend to tangle and contact each other, thus reducing the available surface area of the exposed carbon nanotubes, as compared to directionally aligned nanotubes which are always separated from each other and fully expose all of the circumferential surface area of each nanotube. Furthermore, the fabrication technique employed in the application is likely to result in a relatively low density of catalyst particles on the nanotube circumferential surface.

Therefore, these is a need to develop a highly gas-reacting efficient fuel cell structure, and hence a need for improved and advanced electrode materials with very large surface area covered with very small, high-density catalyst particles.

SUMMARY OF THE INVENTION

The present invention provides carbon nanotubes for a fuel cell having an ultra-large surface area, a nanocomposite having high gas-reaction efficiency including the same, methods of fabricating the carbon nanotubes and the nanocomposite, and a fuel cell with improved efficiency including the nanocomposite.

According to an aspect of the present invention, there is provided carbon nanotubes for a fuel cell which are separated by a predetermined distance from each other and aligned in the same direction to each other, wherein an angle of inclination of the carbon nanotubes with respect to an orientation axis is 30° or less.

The density of the carbon nanotubes may be in the range of $10^7$ to $10^{12}$ nanotubes/cm$^2$, the average diameter of carbon nanotubes may be in the range of 2 to 200 nm, and the predetermined distance separating the carbon nanotubes may be in the range of 10 to 200 nm.

According to another aspect of the present invention, there is provided carbon nanotubes having a hierarchial structure for a fuel cell, the carbon nanotubes comprising: primary carbon nanotubes which are separated by a predetermined distance from and aligned from each other and whose angle of inclination with respect to an orientation axis is 30° or less; and secondary carbon nanotubes which are perpendicular to the primary carbon nanotubes, or whose angle of inclination with respect to an axis perpendicular to the primary carbon nanotubes is 80° or less.

The average diameter of the primary carbon nanotubes may be in the range of 10-200 nm, and the average diameter of the secondary carbon nanotubes may be in the range of 3-50 nm.

The carbon nanotubes may further include tertiary carbon nanotubes aligned perpendicular to the secondary carbon nanotubes.

The average diameter of the tertiary carbon nanotubes may be in the range of 2-20 nm.

According to still another aspect of the present invention, there is provided a method of producing carbon nanotubes for a fuel cell, the method including: making a carbon nanotube-nucleating catalyst layer on a backing substrate; and growing vertically aligned primary carbon nanotubes which are separated in a predetermined distance from each other and whose angle of inclination with respect to an orientation axis is 30° or less using a plasma CVD process using a carbonaceous source gas and an applied predetermined electric field.

The applied electric field may be in the range of 200-800V, in particular 300-600V. In this case, the gap between an anode and a cathode may be 1 cm.

When the backing substrate is formed of carbon fibers, the method may further include an interface layer formed of at least one material selected from Ti, Cr, Zr, Hf, Mo, and Ta interposed between the backing substrate and the carbon nanotube-nucleating catalyst layer.

The method may further include the step dispersing a catalyst for a fuel cell electrode onto the vertically aligned primary carbon nanotubes; and the additional step growing the mutually separated secondary carbon nanotubes on the primary carbon nanotubes in a direction of applied the electric field.

The secondary carbon nanotubes may be grown perpendicularly to the primary carbon nanotubes, or at an angle of inclination with respect to an axis perpendicular to the primary carbon nanotubes of 80° or less, thereby forming a hierarchial structure.

The catalyst may be dispersed using one of a wet electrochemical process, a dry thin deposition process, and a supercritical $CO_2$ fluid deposition process.

The catalyst may be adhered by using a wet electrochemical process, a dry thin film deposition process, or a supercritical $CO_2$ fluid deposition process.

The method may further include adhering a carbon nanotube-nucleating catalyst onto the sidewall surface of the vertically aligned primary carbon nanotubes; applying an electric field to the resultant to grow the aligned, mutually separated secondary carbon nanotubes on the primary carbon nanotubes in the direction in which an electric field is applied; and adhering a carbon nanotube-nucleating catalyst on surfaces of the secondary carbon nanotubes and applying an electric field thereto to grow aligned tertiary carbon nanotubes in a direction in which the electric field is applied.

According to yet another aspect of the present invention, there is provided a nanocomposite for a fuel cell, the nanocomposite including: a backing substrate; and the fuel cell carbon nanotubes, wherein a metallic catalyst for a fuel cell electrode is uniformly dispersed on the surfaces of the carbon nanotubes.

The backing substrate may be selected from the group consisting of carbon cloth, carbon paper, a ceramic porous structure with macropores, and a ceramic porous structure with micropores.

The average diameter of the metallic catalyst for a fuel cell electrode may be in the range of 1-20 nm, preferably 1-10 nm, and most preferably 1-5 nm.

The metallic catalyst may include at least one element selected from the group consisting of Pt, Pd, Rd, Ru, and their alloys.

When the backing substrate is formed of carbon paper, the nanocomposite may further include an interface layer formed of at least one material selected from Ti, Cr, Zr, Hf, Mo, and Ta interposed between the backing substrate and a carbon nanotube-nucleating catalyst layer.

According to another aspect of the present invention, there is provided a method of producing a nanocomposite for a fuel cell, the method including: depositing a carbon nanotube-nucleating catalyst layer on a backing substrate; growing aligned carbon nanotubes using a plasma chemical vapor deposition process using a carbonaceous source gas and application of a predetermined electric field, wherein the angle of inclination of the carbon nanotubes with respect to an orientation axis is 30° or less; and dispersing nanoparticles of a metallic catalyst for a fuel cell electrode to surfaces of the carbon nanotubes.

The adhering of the nanoparticles of the metallic catalyst may be performed using an electrochemical process, a thin film deposition process, a supercritical $CO_2$ fluid deposition process, or a reverse micelle nanoparticle deposition process.

The applied electric field may be in the range of 200-800V.

The method may further include: making a carbon nanotube-nucleating catalyst onto the sidewall surfaces of the vertically aligned primary carbon nanotubes; and applying an electric field to the resultant to grow aligned, mutually separated secondary carbon nanotubes on the primary carbon nanotubes in a direction in which the electric field is applied.

The secondary carbon nanotubes may be grown perpendicularly to the primary carbon nanotubes, or at an angle of inclination with respect to an axis perpendicular to the primary carbon nanotubes of 80° or less, thereby forming a hierarchial structure.

The dispersing of nanoparticles of the metallic catalyst may be performed by a wet electrochemical process, a dry thin film deposition process, or a supercritical $CO_2$ deposition process.

According to still another aspect of the present invention, there is provided a method of producing the nanocomposite using a supercritical $CO_2$ deposition method, wherein carbon nanotubes aligned on a backing substrate are mixed with a metallic catalyst precursor for a fuel cell electrode whereupon the resulting mixture is reduced in a supercritical $CO_2$ fluid using hydrogen gas.

The method may be performed at a temperature of 100-350° C.

A metallic catalyst precursor for a fuel cell electrode may include at least one material selected from the group consisting of platinum (II) 2,4-pentanedionate, platinum bisacetylacetonate, tetraammineplatium acetate, tetraamminepalladium acetate, palladium bisacetylacetonate, rhodium acetate, rhodium trisacetylacetonate, ruthenium acetate, ruthenium trisacetylacetonate, chloroiridic acid, and chloro biscyclooctine iridium dimmer, and the amount of the metallic catalyst precursor for a fuel cell may be in the range of 100-900 parts by weight based on 100 parts by weight of carbon nanotubes aligned on the backing substrate. More preferably, the amount of the metallic catalyst precursor for a fuel cell may be in the range of 300-700 parts by weight based on 100 parts by weight of carbon nanotubes aligned on the backing substrate.

According to yet another aspect of the present invention, there is provided an electrode for a fuel cell including the nanocomposite.

According to another aspect of the present invention, there is provided a fuel cell including a fuel cell electrode including the nanocomposite.

The average diameter of particles of the fuel cell electrode metallic catalyst may be in the range of 1-20 nm. The fuel cell electrode metallic catalyst of the nanocomposite comprises at least one material selected from Pt, Pd, Rh, Ru, and their alloys.

According to still another aspect of the present invention, there is provided a nanocomposite for a fuel cell produced using a supercritical $CO_2$ fluid deposition method, wherein a mesoporous carbon support having mesopores is mixed with a precursor of a metallic catalyst and the mixture is reduced in a supercritical $CO_2$ fluid using hydrogen gas so that nanoparticles of the metallic catalyst are dispersed to interior and exterior surfaces of the mesoporous carbon support having mesopores.

The mesoporous carbon support may have a primary particle average diameter of 500 nm or less, an average diameter of pores of 3-10 nm, and a surface area of 300-3000 $m^2/g$.

According to still another aspect of the present invention, there is provided a method of producing a nanocomposite for a fuel cell using a supercritical $CO_2$ fluid deposition method, wherein a mesoporous carbon support having mesopores is mixed with a metallic catalyst precursor and the mixture is reduced in a supercritical $CO_2$ fluid using hydrogen gas so that nanoparticles of the metallic catalyst are dispersed to interior and exterior surfaces the mesoporous carbon support having mesopores.

According to yet another aspect of the present invention, there is provided an electrode for a fuel cell including the nanocomposite described above.

According to another aspect of the present invention, there is provided a fuel cell including an electrode for a fuel cell including the nanocomposite described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
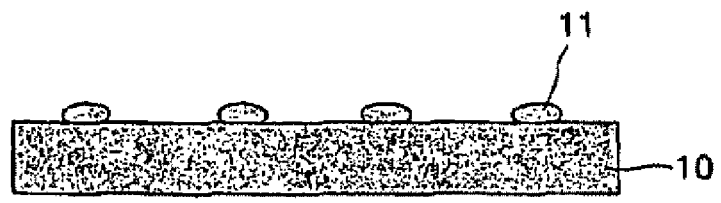
FIGS. 1A through 1C schematically illustrate a method of growing nanotubes and adhering fuel cell catalyst particles according to an embodiment of the present invention.

Hereinafter, the present invention will be described in detail by explaining embodiments of the invention with reference to the attached drawings.

The present invention discloses a nanocomposite including a backing substrate, and aligned or hierarchial-structured carbon nanotubes to which ultra-high-density nanoparticles of a metallic catalyst are uniformly adhered.

The backing substrate may be formed of carbon cloth, carbon paper, or conductorized macroporus or microporous ceramic porous supporting substrate. The nanocomposite provides an improved catalyst system having high conversion efficiency of various chemical, electrochemical or gas reactions.

The present invention also discloses a fuel cell including the nanocomposite. In the fuel cell, ultra-high-density nanoparticles of a metal or an alloy are uniformly dispersed to the surfaces of aligned or hierarchial-structured carbon nanotubes, which are formed an inside or surface of a porous backing substrate formed of carbon cloth, carbon paper, or conductorized macroporus or microporous ceramics.

The present invention also provides a method of uniformly dispersing ultra-high-density nanoparticles of metal or alloy onto surfaces of aligned or hierarchical-structured carbon nanotubes. For example, a supercritical fluid method, a reverse micelle method, and an electrodeposition method are provided.

The present invention also provides a fuel cell with improved efficiency. The fuel cell includes an electrode having aligned or hierarchial-structured carbon nanotubes grown on a carbon backing substrate, wherein uniformly dispersed, ultra-high-density nanoparticles of metal or an alloy are adhered to the aligned or hierarchial-structured carbon nanotubes.

The present invention also discloses catalytic electrode structures including aligned carbon nanotube structures on a carbon substrate and grown inside pored, conductorized substrates, such as microporous silica layers or anodized alumina membranes, with an attachment of ultra-high-density fuel cell catalyst nanoparticles uniformly and efficiently on the surface of the aligned nanotubes. Such pored substrates also serve as a gas diffusion layer with more uniform delivery and availability of fuel gas to the catalyst particles in the pores.

The present invention also provides a supercritical fluid method of depositing uniformly dispersed ultrahigh-density nanoparticles of metal or an alloy onto mesoporous carbon having structured mesopores.

Carbon nanotubes for a fuel cell according to an embodiment of the present invention are separated by a uniform distance from each other and aligned. The angle of inclination with respect to an orientation axis is 30° or less, preferably 15° or less, and more preferably, 0-10°. When the angle of inclination with respect to the orientation axis is greater than 30° and the separation distance is small, adjacent nanotubes may contact each other, thus increasing a difficulty in growing secondary and tertiary nanotubes.

The orientation axis is the same as a direction in which an electric field is applied. The angle of inclination with respect to the orientation axis can be estimated by measuring the angle of inclination of carbon nanotubes illustrated in a sectional SEM image, from a viewpoint located parallel to a backing substrate.

Carbon nanotubes for a fuel cell according to another embodiment of the present invention have a hierarchial structure including primary carbon nanotubes and secondary carbon nanotubes. Primary carbon nanotubes are separated by a uniform distance from each other and aligned, and the angle of inclination is 30° or less. Secondary carbon nanotubes are grown perpendicularly to the primary carbon nanotubes, or aligned such that the angle of inclination of the secondary carbon nanotubes with respect to an axis perpendicular to the primary carbon nanotubes is 80° or less.

The angle of inclination of the secondary carbon nanotubes may be in the range of 0-10°. The distance between carbon nanotubes may be in the range of 10-200 nm, and may be 10-100 nm. The average diameter of the primary carbon nanotubes may be in the range of 10-200 nm. The average diameter of the secondary carbon nanotubes may be in the range of 3-50 nm. When the average diameter of the primary carbon nanotubes is less than 10 nm and the average diameter of the secondary carbon nanotubes is less than 3 nm, the mechanical strength of the carbon nanotubes is small and the available surface area for catalyst particles is too small. When the average diameter of the primary carbon nanotubes and the average diameter of the secondary carbon nanotubes are outside these ranges, an increase of the surface area of the backing substrate by the hierarchical carbon nanotubes is small.

The present invention also provides tertiary carbon nanotubes aligned perpendicularly to the second carbon nanotubes.

The average diameter of the tertiary carbon nanotubes may be in the range of 2-20 nm.

The density of carbon nanotubes for a fuel cell according to an embodiment of the present invention may be in the range of $10^7$-$10^{12}$ nanotubes/$cm^2$, and may be $10^8$-$10^{11}$ nanotubes/$cm^2$. When the density of the carbon nanotubes is greater than $10^{12}$ nanotubes/$cm^2$, carbon nanotubes are clumped to form a bundle structure.

Figure 1B:
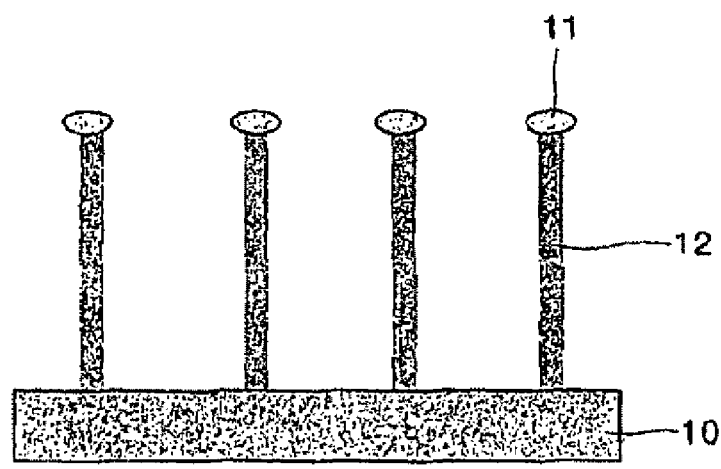
Figure 1C:
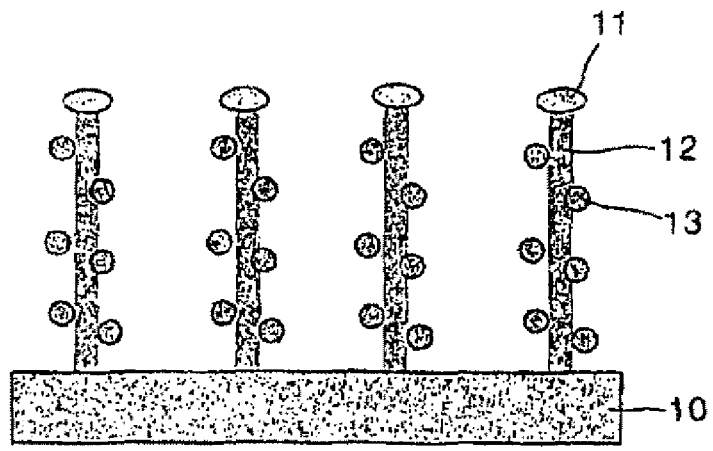

FIGS. 1A through 1C illustrate a method of fabricating carbon nanotubes for a fuel cell according to an embodiment of the present invention.

Referring to FIG. 1A, first, a carbon nanotube-nucleating catalyst is attached to a backing substrate 10 to form a carbon nanotube-nucleating catalyst layer 11.

Referring to FIG. 1B, a plasma chemical vapor deposition (CVD) process using a carbonaceous source gas is performed to form carbon nanotubes 12 and then a predetermined electric field is applied such that the carbon nanotubes 12 are separated by a predetermined distance from each other and parallel aligned along the direction of applied electric field. The separation interval may be in the range of 10-200 nm.

The direction of carbon nanotubes grown during CVD can be controlled by utilizing an applied electric field in a plasma CVD process. See articles by C. Bower et al., "Plasma-induced Alignment of Carbon Nanotubes" published in Applied Physics Letters, Vol. 77, page 830 (2000), and J. F. AuBuchon, et al., "Multiple Sharp Bending of Carbon Nanotubes during Growth to Produce Zig-Zag Morphology", published in Nano Letters, Vol. 4, page 1781 (2004).

The applied electric field may be in the range of 200-800 V. When the electric field is less than 200 V, the carbon nanotubes are less oriented. When the electric field is greater than 600 V, too much sputtering occurs and carbon nanotubes are transformed into nanocons having a large diameter, thereby reducing the entire surface area.

In this process, the aligned nanotubes are grown on a backing substrate so as to provide a very large surface area and thus, a very large number of fuel cell catalyst particles are attached to the surfaces of these aligned carbon nanotubes. The alignment and associated mutual separation of adjacent nanotubes is important as it minimizes the physical contact and entanglement between adjacent nanotubes, which not only reduces the total available outer surface area of the subsurfaces of the nanotubes, but also introduces a microscale inhomogeneous flow of the reactant fuel, such as hydrogen or methanol in such a clumped structure, thus reducing the overall fuel cell efficiency.

The backing substrate, which is used to fabricate the nanocomposite for a fuel cell according to an embodiment of the present invention, may be formed of one selected from a group consisting of carbon cloth, carbon paper, a ceramic porous structure with micropores, and a porous structure with macropores.

The backing substrate suitable for the aligned nanotube growth may be a highly porous substrate, such as carbon cloths (or carbon papers) consisting of woven or stack-assembled carbon fibers.

In order that high surface area is available for nanotube growth, an average diameter of the carbon fibers may be 50 µm or smaller, and may be 5 µm or smaller. For example, the average diameter of the carbon fibers may be in the range of 1-5 µm.

The optimal volume fraction of the carbon fibers is determined by a number of parameters, balancing the need for high surface area and the need for easy passage of the reactant gas through the carbon cloth. The volume fraction of carbon fibers in the nanocomposite electrodes may be in the range of 5-80%, and may be 10-60%, or 30-50%. Examples of other porous backing substrates suitable for the nanocomposite electrodes according to the current embodiment of the present invention include a microporous or macroporous material (e.g., micro or macroporous silica) or an anodized alumina membrane with aligned nanopores. A non-porous substrate such as a silicon substrate can also be used as the backing substrate.

The average diameter of micropores may be in the range of 10-100 nm, and the average diameter of macropores may be in the range of 0.05-200 µm.

The nanotube-nucleating catalyst particles, such as Fe, Ni, Co, or their alloys are deposited on the substrate surface. Various techniques can be used for this.

First, a thin film of Fe, Ni, Co, or alloys containing one or more of these elements can be deposited on a substrate by sputtering, evaporation, chemical vapor deposition, electroplating, or electroless plating.

Alternatively, pre-formed nanoparticles of Fe, Ni, Co, or alloys containing one or more of these elements can be deposited on the substrate by using electrophoresis, supercritical $CO_2$ fluid deposition, spray coating, or dip coating into a slurry containing these nanoparticles.

If the substrate is a carbon cloth formed of carbon fibers, a thin film of Fe, Ni, Co, or alloys containing one or more of these elements does not adhere to the surface of the carbon fibers. Therefore, according to the current embodiment of the present invention, an interface layer formed of one or more of Ti, Cr, Zr, Hf, Mo, and Ta is deposited first on the carbon fiber backing substrate, and then, nanotube-nucleating catalyst is deposited on the Ti layer to retain nanotube-nucleating catalyst on the fiber surface.

The carbon cloth is preferentially rotated or intermittently titled so that the sputtered or evaporated catalyst atoms can reach most of the carbon fibers overcoming the shadow effect of some upper fibers. The carbon cloth substrate can also be turned over to be deposited with the thin film again to ensure more uniform coverage of the carbon fibers. Nanotubes can be grown by CVD again with the cloth substrate turned over after the first CVD growth.

The average diameter of carbon nanotubes may be in the range of 2-200 nm, and may be 5-50 nm. The length of the nanotubes depends on the space available in the porous substrate, but is typically in the range of 0.01-100 µm, and may be 0.1-20 µm. When the length of the nanotubes is less than 0.01 µm, the available surface area for loading electrode catalysts is too small. When the length of the nanotubes is greater than 100 µm, their flexibility increases so that adjacent nanotubes can contact each other.

FIG. 1B schematically illustrates an array of vertically aligned, mutually separated carbon nanotubes 12.

Hereinafter, a method of growing carbon nanotubes on carbon fibers (carbon paper) according to an embodiment of the present invention will be described in detail.

First, vertically aligned carbon nanotubes are grown on a carbon paper substrate using a DC plasma CVD method. An interface layer Ti of 1-10 nm thickness is first applied by sputtering, and then a nanotube-nucleating catalyst layer Ni of 2-20 nm thickness is deposited by sputtering, thereby fabricating a doubled-layered catalyst layer.

Before the growth of nanotubes, the substrate including the catalyst layer may be heated at 500-900° C., in particular about 700° C., according to properties of the catalyst layer in a hydrogen atmosphere to break up the Ni layer into isolated nano-islands having an average diameter of 30-150 nm.

A pressure of a CVD chamber may be in the range of $1 \times 10^{-2}$ to 10 torr, in particular, about $5 \times 10^{-2}$ torr during a hydrogen treatment. Ammonia ($NH_3$) gas is added to the chamber to replace hydrogen gas. A DC bias voltage of 300-600 V, in particular about 450 V, is applied between an anode and a cathode to produce plasma, thereby growing carbon nanotubes with a different morphology. The anode and the cathode are separated by a distance of 0.5-2 cm, in particular about 1 cm.

Due to the presence of plasma directly on the sample and a thinner dark space of cathode, the electric field applied to the nanotubes is much greater than a reference electric field applied between the cathode and the anode. Then, ammonia gas and acetylene gas are provided to the chamber at a total gas pressure of 1-6 torr, in particular about 3 torr, in a flow of 10-100 sccm, in particular 30 sccm, thereby growing nanotubes with multiwalls.

Plasma is maintained for 5-20 minutes so that nanotubes are grown to a length of 0.5-2 µm on carbon micro fibers. An electric SEM is used to measure the morphology of the micro-structure of the grown nanotubes. A high resolution TEM and an energy dispersion spectroscope (EDX) are used to identify the structure and composition of carbon nanotubes using Jeol 2010 microscope at 200 keV.

The next step is to adhere an electrode catalyst particles 13 for a fuel cell, formed of Pt, Pd, Rh, Ru, or an alloy thereof onto the sidewall surfaces of the grown carbon nanotubes as illustrated in FIG. 1C. The average diameter of the electrode catalyst particles 13 is in the range of 1-20 nm.

The alignment and separation of the nanotubes according to an embodiment of the present invention avoids undesirable agglomeration of the nanotubes which can reduce the available outer surface area onto which the fuel cell catalyst nano particles are to be adhered. That is, the addition of the aligned nanotubes on carbon fibers of the carbon cloth dramatically increases the surface area.

In the nanotube-containing carbon cloth electrode structure, the total surface area of the carbon cloth is increased by at least 10 times, and may be at least 30 times or at least 100 times.

Figure 2:
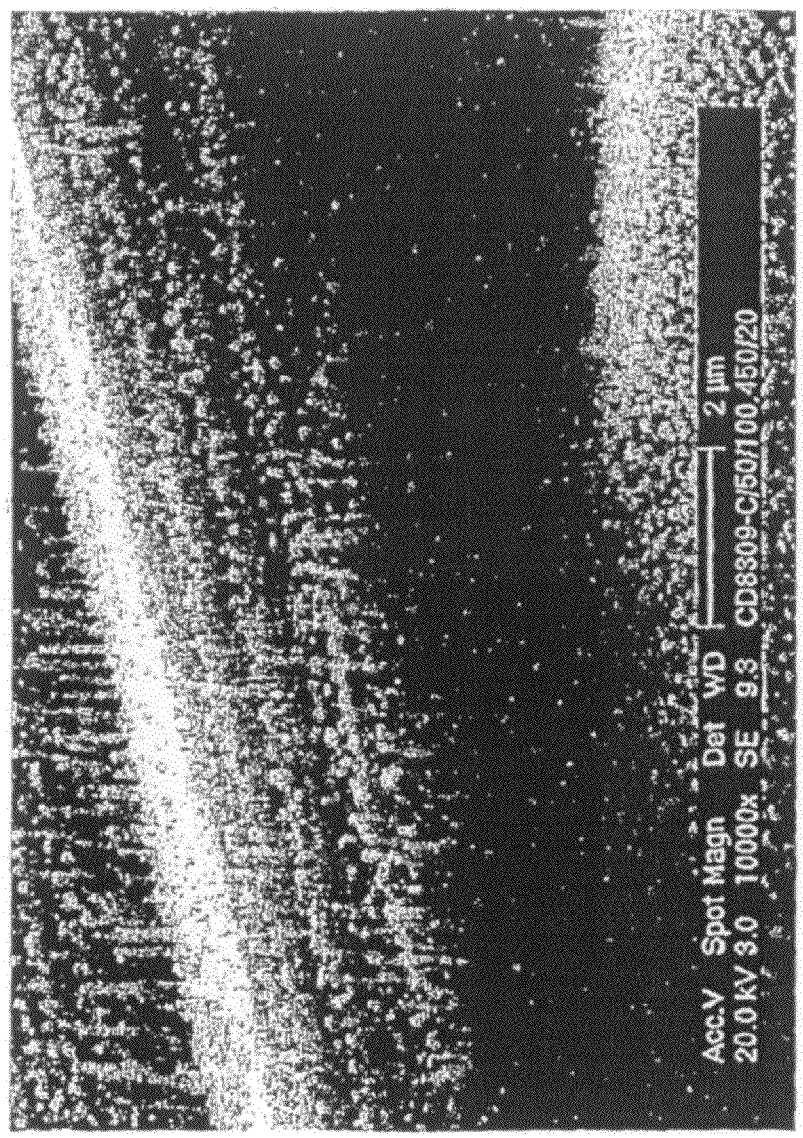
FIG. 2 is a scanning electron microscope (SEM) image of aligned carbon nanotubes grown on carbon cloth using the process of the present invention.

FIG. 2 is a SEM image of aligned nanotubes adhered to fibers of carbon cloth using the process illustrated in FIGS. 1A through 1C according to the current embodiment of the present invention.

This structure can be obtained by first sputtering Ti on a backing substrate to a thickness of 1-10 nm to form the interface layer, and then without exposure to air a Ni layer is sputter deposited to a thickness of 2-20 nm.

This structure can be obtained by first sputtering Ti on a backing substrate to a thickness of 1-10 nm to form a nanotube-nucleating metal layer, and then without exposure to air a Ni layer is sputter deposited to a thickness of 2-20 nm.

Figure 3:
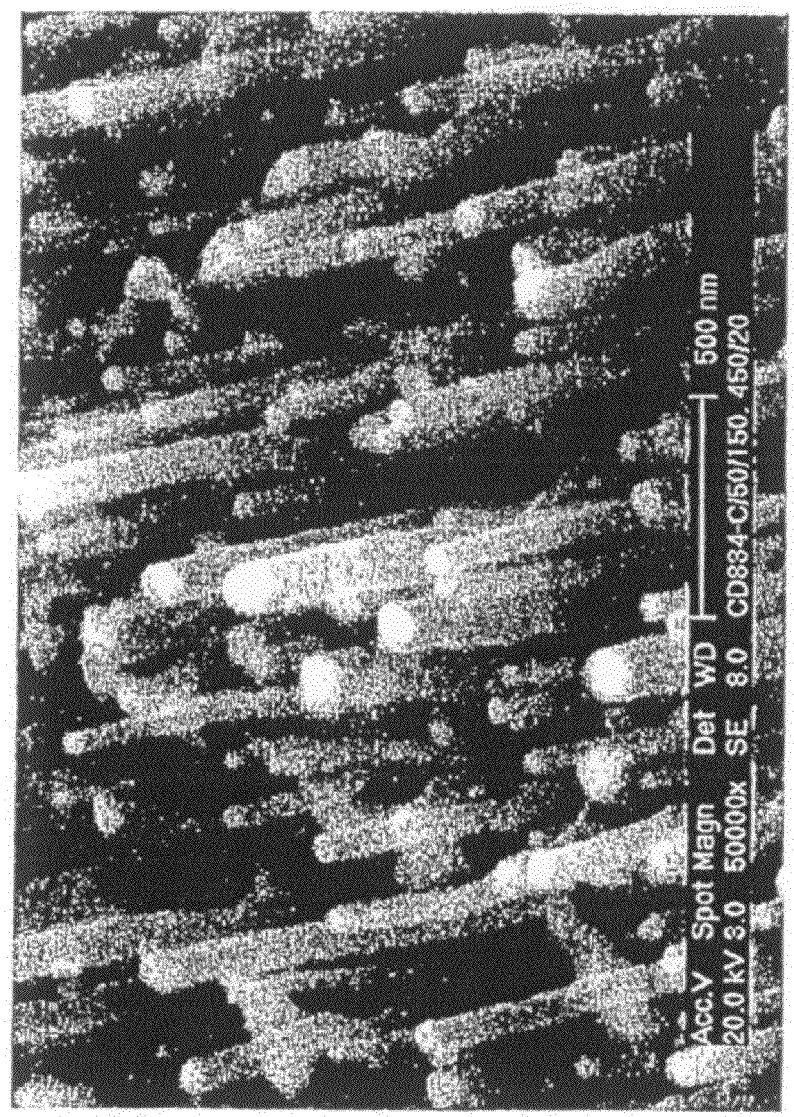
FIG. 3 is a higher magnification SEM image of the aligned carbon nanotubes of FIG. 2 (×50,000)

Then, carbon nanotubes are grown at 700° C. for 20 minutes using a DC plasma CVD process. During the CVD process, an electric field of 450V is continuously applied such that carbon nanotubes are aligned. In this case, a mixed gas of ammonia ($NH_3$) and acetylene ($C_2H_2$) is used as a source gas for CVD growth of nanotubes, with a total $NH_3$ and $C_2H_2$ pressure maintained at about 3 torr. FIG. 3 is a higher magnification SEM image of FIG. 2 (×50,000 times).

Figure 4A:
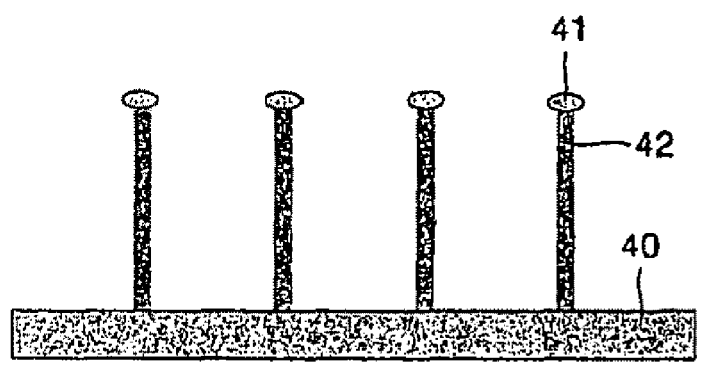
FIGS. 4A through 4D illustrate a method of fabricating carbon nanotubes for a fuel cell according to an embodiment of the present invention.
Figure 4B:
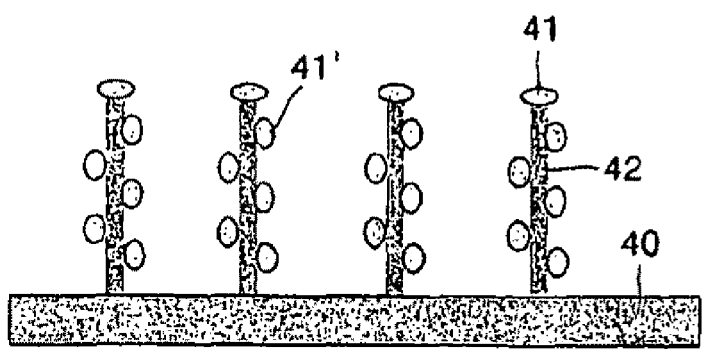
Figure 4C:
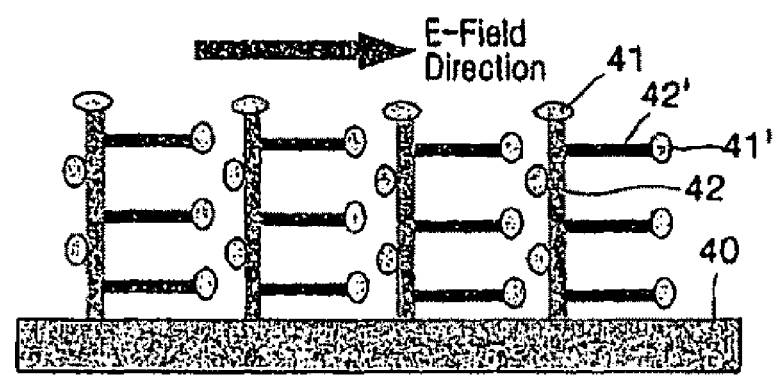
Figure 4D:
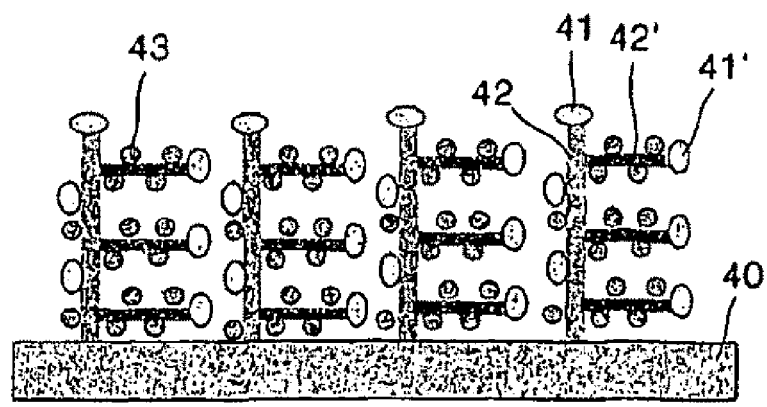

FIGS. 4A through 4D schematically illustrate a method of forming an array of carbon nanotubes in a hierarchial structure according to another embodiment of the present invention. In particular, FIG. 4A illustrates nanotube catalyst deposition followed by growth of aligned, mutually-separated nanotubes. FIG. 4B illustrates nanotube-nucleating catalyst deposition on nanotube walls illustrated in FIG. 4A. FIG. 4C illustrates growth of nanotubes in a direction, which is different from the growth direction of the previously grown nanotubes, by electric field oriented CVD. FIG. 4D illustrates deposition of high-density fuel cell catalyst nanoparticles on hierarchical nanotube arrays. Additional description referring to FIGS. 4A through 4D will now be described. Firstly, vertically aligned primary carbon nanotubes 42 are grown using nanotube-nucleating catalysts 41 as illustrated in FIG. 4A, and then nanotube-nucleating catalyst particles 41' are attached to sidewall surfaces of the primary carbon nanotubes 42 as illustrated in FIG. 4B.

Then, secondary carbon nanotubes 42' are grown on the sidewall surfaces of the primary carbon nanotubes using an electric field oriented CVD process, as illustrated in FIG. 4C.

Subsequently, referring to FIG. 4D, fuel cell electrode catalyst nanoparticles 43 are adhered to the secondary carbon nanotubes 42'.

The repeated application of the nanotube-nucleating catalysts 41' on the sidewall surfaces of the vertically-aligned primary carbon nanotubes 42 allows growth of hierarchial nanotubes in a horizontal growth direction. According to an embodiment of the present invention, such a horizontal, parallel growth of nanotubes is accomplished by an application of an electric filed in a horizontal direction during the CVD plasma growth. The parallel, and mutually separated configuration of the secondary nanotubes 42' is important for retaining a high surface area of the secondary nanotubes 42'. In addition to the problem of simple physical contact, carbon nanotubes, if they are in close proximity, tend to stick together side by side by Van der Waals force to further decrease the overall nanotube surface area. Since the size and density of the secondary nanotubes 42' is dictated by those of the nanotube-nucleating catalysts 41 attached to the sidewalls of the primary nanotubes 42, a proper deposition of the nanotube-nucleating catalysts is important. The nanotube-nucleating catalysts 41 may be Fe, Ni, Co, or alloys thereof.

In order to nucleate high-density and small-diameter secondary nanotubes, three processing approaches are employed according to the current embodiment of the present invention—wet electrochemical processing, dry thin film deposition, and supercritical $CO_2$ fluid deposition.

1) Wet Electrochemical Processing

Processing such as electroplating, electroless plating, or electrophoresis of pre-made metal particles can be used for deposition of the nanotube-nucleating catalysts 41 (Fe, Ni, Co, or alloys thereof) An example process is given as follows.

Electrodeposition of Ni particles onto primary nanotubes is performed for the subsequent growth of high density secondary nanotubes.

The deposition is performed using a mixed solution of 10-100 g/L, in particular 45 g/L, of $NiCl_2$; 100-600 g/L, in particular 300 g/L, of $NiSO_4$; and 10-100 g/L, in particular, 45 g/L $H_3BO_3$ at 5-40° C., in particular 20° C. The deposition potential is in the range of −0.8 V to −1.6 V, in particular −1.2 V, vs saturated calomel electrode (SCE obtained from Aldrich). The loading is controlled by the total charge applied.

While the electrochemical processing is a viable technique to attach metal particles onto primary nanotube arrays, especially when the diameter of the primary nanotubes is relatively large (e.g., greater than 30 nm) and they are mechanically sturdy, it is noted that finer diameter nanotubes tend to get moved by the wet processing and agglomerate thus reducing the total available surface area of the primary nanotubes. This is illustrated by an SEM image illustrated in FIG. 5. Therefore, in order to prevent such undesirable nanotube agglomeration, the use of electrochemical processing on aligned nanotubes may be limited to larger diameter nanotube arrays.

When the particles of Ni are attached during the wet processing, $NiCl_2$ and $NiSO_4$ are used. Meanwhile, when particles of Fe or Co are used instead of Ni particles, the same method as described above is used except that their own precursors are used.

A Ni precursor may be $NiCl_2$, $NiSO_4$, $Ni(NO_3)_2$, or the like.

A Fe precursor may be $FeCl_3$, $Fe_2(SO_4)_3$, $Fe(NO_3)_3$, or the like. A Co precursor may be $COCl_2$, $CoSO_4$, $Co(NO_3)_2$, or the like.

2) Metal Film Deposition Method

For primary nanotubes with an average diameter of 30 nm or greater, a dry or semi-dry processing method is more suitable. One exemplary process of depositing the nanotube-nucleating catalyst on the primary nanotubes without excessively disturbing their aligned and mutually-separated configuration is an oblique incident thin film deposition method as illustrated in FIGS. 6A through 6D.

Figure 6A:
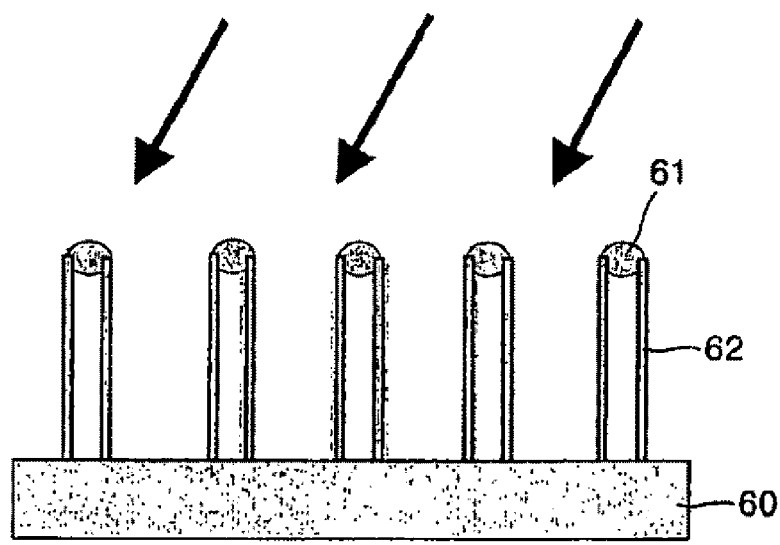
FIGS. 6A through 6D schematically illustrate a process of depositing nanotube-nucleating catalyst on sidewalls of nanotubes using an oblique thin film deposition technique.
Figure 6B:
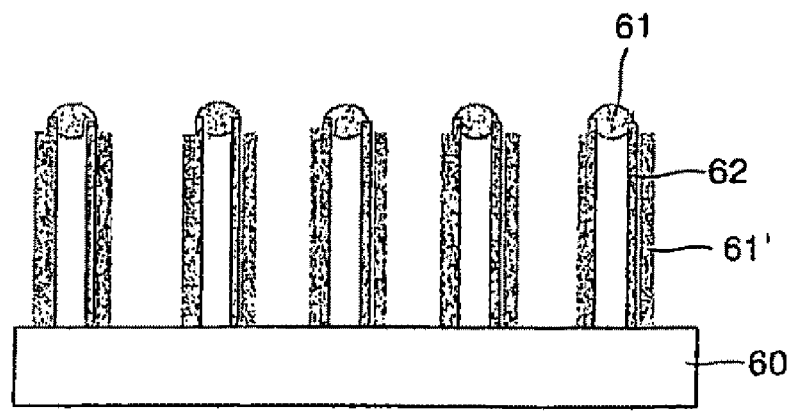
Figure 6C:
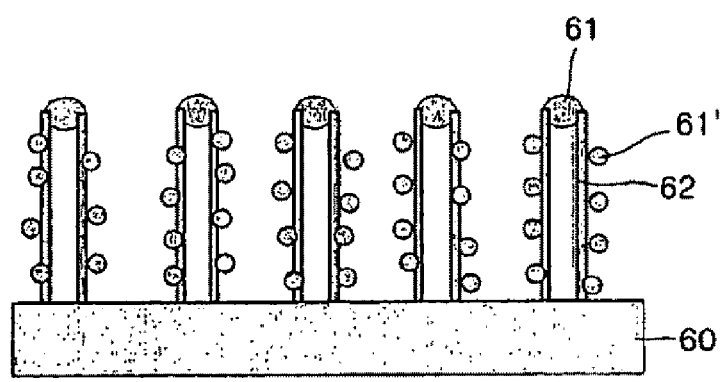

FIGS. 6A through 6D schematically illustrate a method of depositing nanotube-nucleating catalysts 61 on sidewalls of nanotubes using an oblique thin film deposition technique. As illustrated in FIG. 6A, an oblique incident deposition of the nanotube-nucleating catalyst 61 (Fe, Ni, Co, or alloys thereof) is sputter or evaporation deposited on aligned primary nanotubes 62 on a substrate 60.

Optionally, an interface layer (not shown) may be added on a surface of the primary nanotubes 62 to enhance adhesion between the substrate 60 and the nanotube-nucleating catalyst 61. The interface layer may be formed of a metal, such as Ti, Cr, Zr, or the like.

The substrate 60 may be tilted by rotation or rocking of the substrate 60 or the deposition beam angle to overcome a shadow effect by the carbon fibers and nanotubes near the upper surface on other fibers and nanotubes underneath, and to ensure a more uniform deposition. The movement of the substrate 60 allows metal deposition on as much carbon nanotube surface as possible. Such a substrate motion relative to the incoming beam of metal atoms can be carried out in a continuous manner or in an intermittent manner.

Figure 6D:
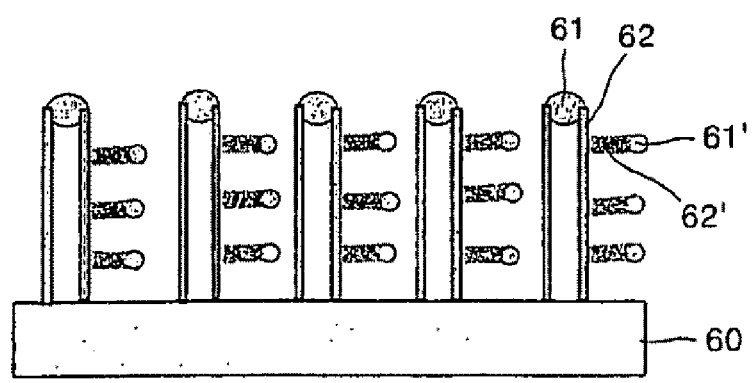

The nanotube-nucleation catalyst can be deposited as either a continuous film (FIG. 6B) or as islands (FIG. 6C) depending on the wettability of the depositing metal on the nanotube surface. During heating of the continuous metal film structure of FIG. 6B during subsequent CVD growth of nanotubes, for example, to 700-900° C., the metal film often breaks up into islands illustrated in FIG. 6C. Then, secondary nanotubes 62' are grown to form a hierarchial structure as illustrated in FIG. 6D.

3) Supercritical $CO_2$ Deposition

Supercritical $CO_2$ has liquid-like and gas-like properties. Like a liquid, it can dissolve solutes; and like a gas, it possesses low viscosity, high diffusivity and negligible surface tension. The fluid is miscible with gases, and its solvation power can be tuned by changing temperature and pressure. These unique properties make supercritical $CO_2$ an attractive medium to alleviate the problem of sluggish mass transfer typically occurring in liquid-phase reactions, thus enabling the precipitation of finer metal nano particles, which is important for fuel cell applications.

Also, with the vapor-like properties, the supercritical $CO_2$ processing allows a delivery of chemical reactants to nanoscale pores or cavities with high-aspect-ratios, complicated surfaces and poorly wettable substrates, thus enabling a more uniform coverage of surfaces. As compared with the low vapor-phase precursor concentrations and mass transfer-limited reactions in a chemical vapor deposition process, precursor concentrations in supercritical $CO_2$ can be up to three orders of magnitude greater, and therefore a higher reaction rate can be achieved.

Figure 5:
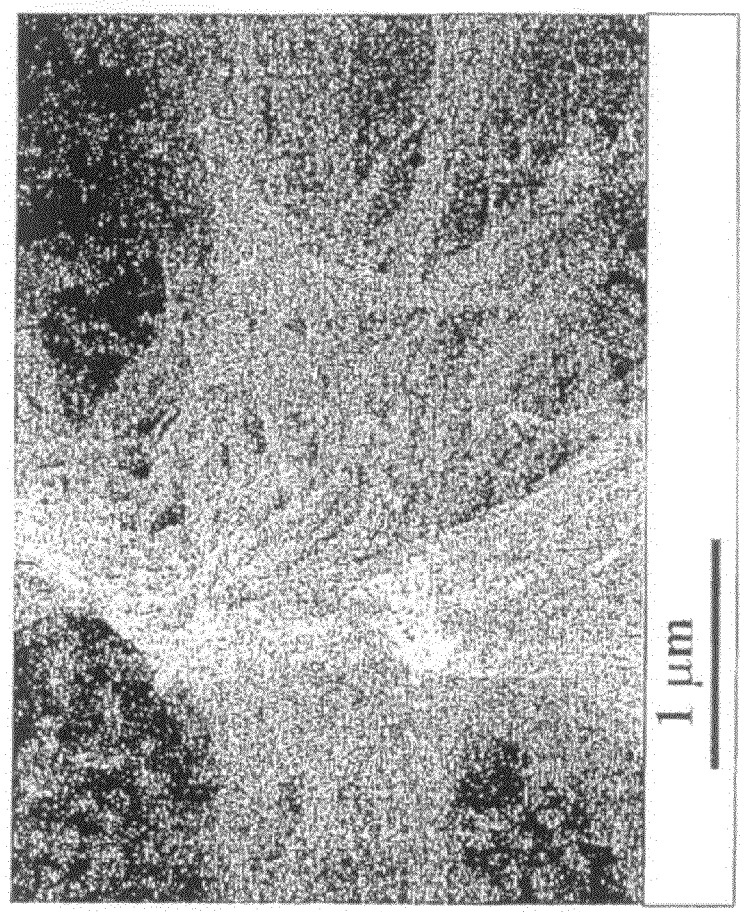
FIG. 5 is a SEM image illustrating clumping of aligned nanotubes when exposed to a liquid such as in aqueous solution processing.

In liquid-based chemical reactions, liquid capillary force often causes undesirable damage or change of nanostructural geometrical features such as vertically-aligned carbon nanotube configurations, as illustrated in FIG. 5. The negligible surface tension of supercritical $CO_2$ also alleviates such a problem, and minimizes disruption of pre-set nano geometry of the substrate. Unreacted materials and by-products from the supercritical $CO_2$ processes can be easily removed from the system by flushing the system with $CO_2$ fluid, and thus high purity reaction products are attainable. In addition, supercritical $CO_2$ is generally nontoxic, unflammable and recyclable, therefore the liquid waste problem can be minimized. In the present invention, highly dispersed nanoparticles of nanotube-nucleating catalyst are deposited onto the external walls of carbon nanotubes in the aligned carbon nanotube structures through hydrogen reduction of a metal precursor of nanotube-nucleating catalyst dissolved in supercritical $CO_2$. The reaction involves only $H_2$ and metal precursors. Such a simple and "green" nanoparticle deposition technique is not limited to single metal deposition.

The amount of the metal precursor may be in the range of 10-1000 parts by weight based on 100 parts by weight of carbon nanotubes which are separated by a predetermined distance from each other and aligned and whose angle of inclination with respect to an orientation axis is 30° or less. When the amount of the metal precursor is less than 10 parts by weight, the growth density of the carbon nanotubes is too low. When the amount of the metal precursor is greater than 1000 parts by weight, sufficient dissolution of the metal precursor cannot be attained and large particles are generated.

The reaction temperature for hydrogen reduction may be in the range of 200-500° C. When the reaction temperature of hydrogen reduction is less than 200° C., sufficient reduction cannot be attained. When the reaction temperature of hydrogen reduction is greater than 500° C., large particles are formed.

According to an embodiment of the present invention, a variety of catalytic metal alloy nanoparticles can also be deposited onto carbon nanotubes by reducing the mixed metal precursors in supercritical $CO_2$. The loading density of the nanoparticles on carbon nanotubes is adjustable by changing the amount of metal precursors used.

Figure 8:
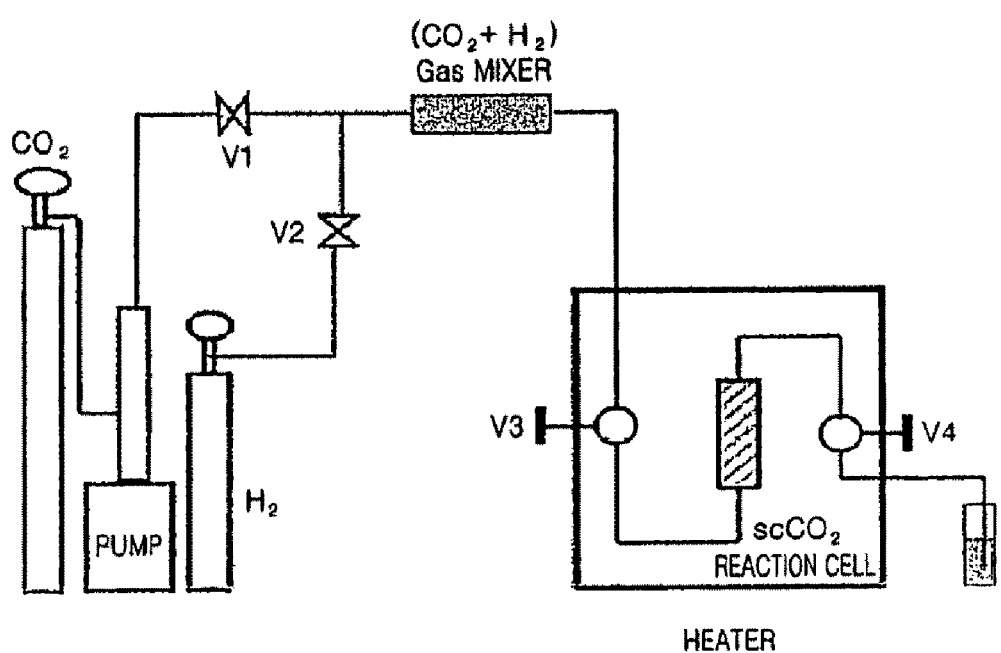
FIG. 8 is a schematic view of a supercritical $CO_2$ fluid deposition system utilized for deposition of high-density nanotube-nucleating catalyst particles or fuel cell catalyst particles on an aligned nanotube array according to an embodiment of the present invention.

FIG. 8 schematically illustrates a supercritical fluid system for depositing highly dispersed nanoparticles of metal and metal alloys onto external sidewalls of carbon nanotubes in aligned carbon nanotube structures according to an embodiment of the present invention. Most commonly supercritical $CO_2$ is used though other supercritical fluids can also be used.

An exemplary supercritical $CO_2$ deposition method of the nanotube-nucleating catalyst, e.g., Ni particles will now be described.

A 10 mg of nickel precursor, nickel (II) 2,4-pentanedionate is loaded in a 10 mL capacity high pressure stainless steel reaction cell along with 1 $cm^2$ of carbon paper over which the carbon nanotubes are aligned. The amount of the nickel precursor may be in the range of 10-1000 parts by weight based on 100 parts by weight of the carbon paper substrate over which carbon nanotubes are aligned.

Referring to FIG. 8, following the precursor loading, a valve V1 is closed while valves V2, V3 and V4 are opened and hydrogen gas at a pressure of 1-8 atm, in particular 3.0 atm, is allowed to flow through the system for 5 mins. to expel the air inside.

After hydrogen loading, the valves V2 and V3 are closed to evacuate the reaction cell, and then the valve V4 is closed while V1 is opened to charge a 100 mL $H_2$—$CO_2$ mixing vessel with 40-160 atm, in particular about 80 atm of $CO_2$. After the $H_2$ and $CO_2$ mixed, the valve V3 is opened forcing the mixture into the reaction cell. The valves V1 and V3 are then closed to allow the dissolution of the Ni precursor in the $CO_2$ solution. To ensure complete dissolution, the reaction cell is left undisturbed for 30 minutes. After that, the reaction cell is heated to a temperature of 500° C. or less, in particular, 200-500° C. and kept at this temperature for 5-10 min. As a result of this supercritical $CO_2$ processing, highly dispersed Ni nanoparticles are deposited onto the carbon nanotube surface.

After the reaction is completed, the reaction cell is cooled and vented, and the $CO_2$ and $H_2$ mixture remaining in the mixing vessel is used to flush the reaction cell twice. The nanotube sample is now ready for the subsequent growth of the hierarchial secondary nanotubes in an aligned manner.

Figure 10A:
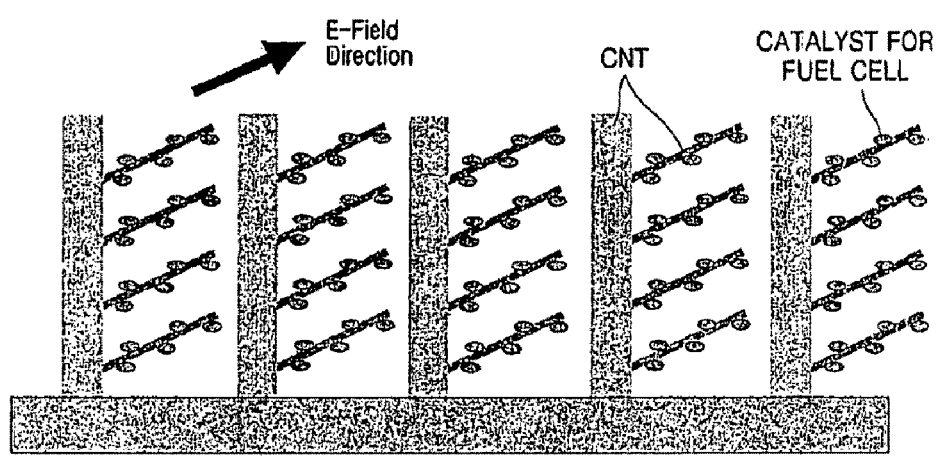
FIGS. 10A and 10B represent a schematic illustration of a nanocomposite for a fuel cell according to an embodiment of the present invention.

Referring to FIGS. 4C and 10A, as long as the secondary nanotubes are grown by an applied electric field in an aligned and mutually-separated fashion, an alternative arrangement of non-horizontal, aligned inclined nanotubes are also acceptable. Too much inclination of the secondary nanotubes with respect to the axis perpendicular to the primary nanotubes can make the secondary nanotubes almost touch the primary nanotubes, so care should be taken not to overly incline the secondary nanotubes.

The desired angle of inclination of the secondary nanotubes with respect to the axis perpendicular to the primary nanotubes is less than 80°, and may be 60° or less, or 0-30°.

Figure 10B:
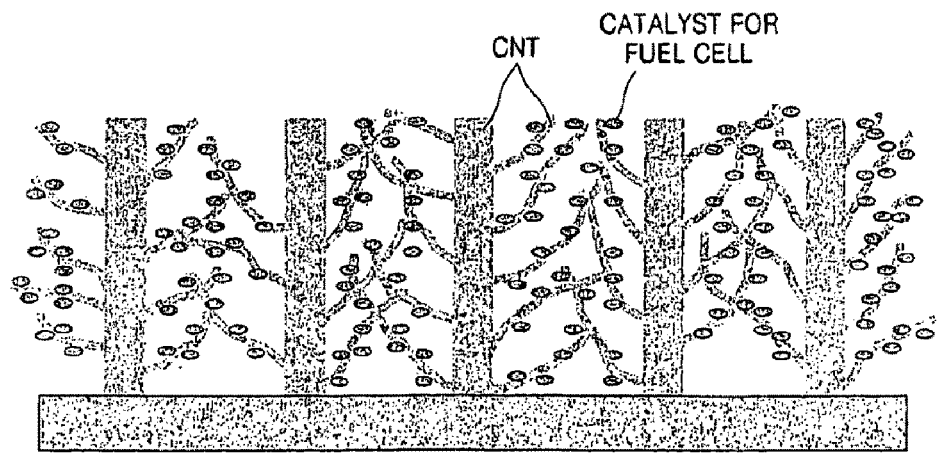

While the aligned and separated configuration of the secondary nanotubes illustrated in FIG. 4B or FIG. 10A are the preferred configurations in this invention, the random configuration of the hierarchically-grown secondary nanotubes illustrated in FIG. 10B is not excluded from the invention as such a structure can also be a viable basis for adhering ultrafine, ultrahigh-density fuel cell catalyst particles.

FIG. 10A illustrates aligned, separated nanotubes that are tilted in a predetermined direction by electric field-oriented CVD, and a high-density fuel cell catalyst dispersed thereon. FIG. 10B illustrates secondary nanotubes grown by non-oriented CVD and a high-density fuel cell catalyst dispersed thereon.

Figure 11:
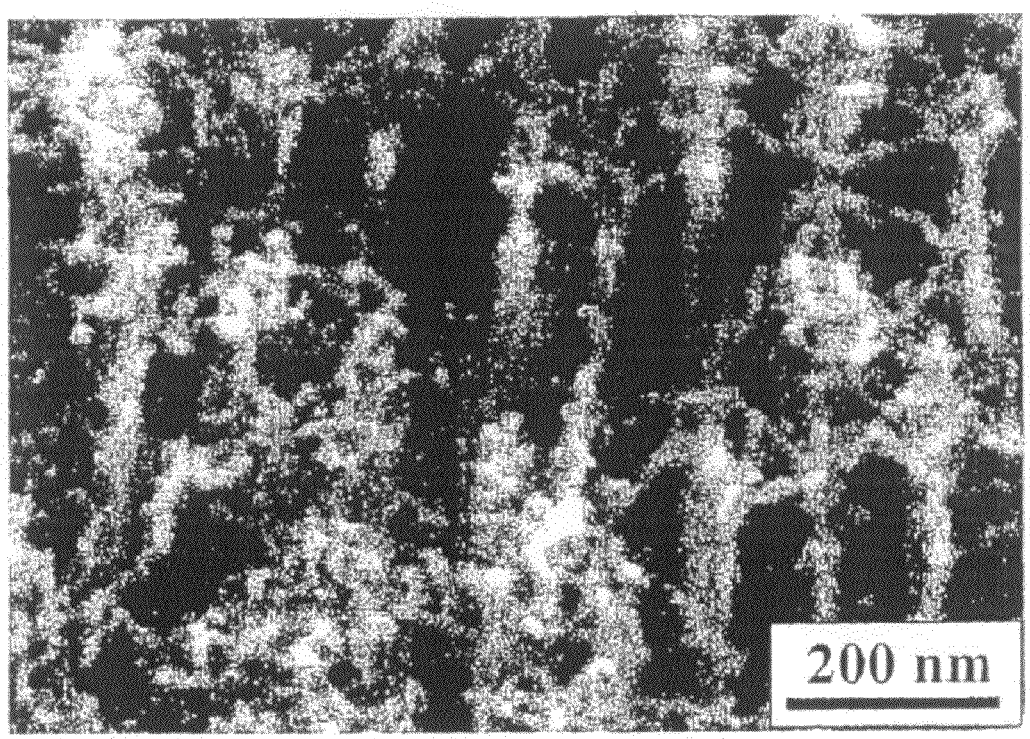
FIG. 11 is a SEM image illustrating a construction of hierarchical branched nanotubes.

FIG. 11 is a SEM image illustrating hierarchically-grown secondary nanotubes having an average diameter of about 5 nm on primary nanotubes having an average diameter of about 40 nm such as schematically illustrated in FIG. 10B.

Once the desired configurations and densities of nanotubes are secured by hierarchial CVD processing, the fuel-cell catalyst nano particles need to be attached onto the exterior walls of the nanotubes. In FIG. 4D, a deposition of ultrahigh-density fuel cell catalyst nanoparticles on hierarchial nanotube arrays of both primary and secondary nanotubes is illustrated.

A fuel cell electrode according to an embodiment of the present invention includes a hierarchically-grown nanotube structure, and fuel cell catalyst particles adhered to the surface of nanotubes. The size of the fuel cell catalyst, such as Pt, Pd, Rh, Ru, Ir and their alloys is kept extremely small, and the density kept as high as possible in order to enhance fuel cell chemical reactions.

The average diameter of the fuel cell catalyst in the structures of FIG. 1C, FIG. 4D, and FIG. 10 may be 20 nm or smaller, 10 nm or smaller, 5 nm or smaller, or may be in the range of 1-5 nm. The density of fuel cell catalyst particles in the structures of FIG. 1C, FIG. 4D, and FIG. 10 is at least $10^{10}$ particles/cm$^2$ (corresponding to an average inter-particle spacing of 20-200 nm, in particular about 100 nm), and may be at least $10^{11}$ particles/cm$^2$ (corresponding to an average inter-particle spacing of 10-50 nm, in particular about 32 nm), or at least $10^{12}$ particles/cm$^2$ (corresponding to an average inter-particle spacing of 5-20 nm, in particular about 10 nm). Such a high density of ultrafine catalyst particles is attached onto the surface of the carbon nanotubes. When the density of the fuel cell catalyst particles is less than $10^{10}$ particles/cm$^2$, the catalyst effect is insufficient.

According to an embodiment of the present invention, the adhering of catalyst particles is accomplished by electrochemical processing, thin film deposition, supercritical $CO_2$ fluid deposition, or reverse micelle nanoparticle deposition.

1) Electrochemical Deposition

Examples of an electrochemical depositing method include electroplating, electroless deposition, electrodeposition, and electrophoresis. In electroplating or electroless deposition from electrolytes containing the metallic catalyst, nanoparticles of fuel cell catalysts are deposited on sidewall surfaces of the nanotubes. If the density of the particles is high enough that a continuous coating is deposited, it usually breaks up into islands anyway on heating to the CVD temperature. An example processing is given as follows.

Electrodeposition of Pt nanoparticles onto an aligned carbon nanotube structure grown on carbon paper is carried out by a three-electrode DC method in a mixed solution of a 0.5-2 g/L, in particular, 0.9 g/L of $PtCl_2$ and a 30-80 ml/L, in particular, 52.5 ml/L of HCl at 20° C. The deposition potential used is 0 V vs SCE and the loading is controlled by the total charge applied. By changing the bath solution, potential, current density and deposition time, both the particle size and loading density of Pt can be tuned.

As discussed earlier, electrochemical processing is a viable technique to attach particles onto primary nanotube arrays, especially when the diameter of the primary nanotubes is relatively large (for example, greater than 30 nm) and they are mechanically sturdy. Meanwhile, finer diameter nanotubes tend to get moved by the wet processing and agglomerate thus reducing the total available surface area of the primary nanotubes, as illustrated by the SEM image illustrated in FIG. 5. Therefore, in order to minimize such undesirable nanotube agglomeration, the use of electrochemical processing on aligned nanotubes is preferably limited to larger diameter nanotubes, e.g., for nanotube diameters of greater than 30 nm.

2) Thin Film Metal Deposition

Figure 7A:
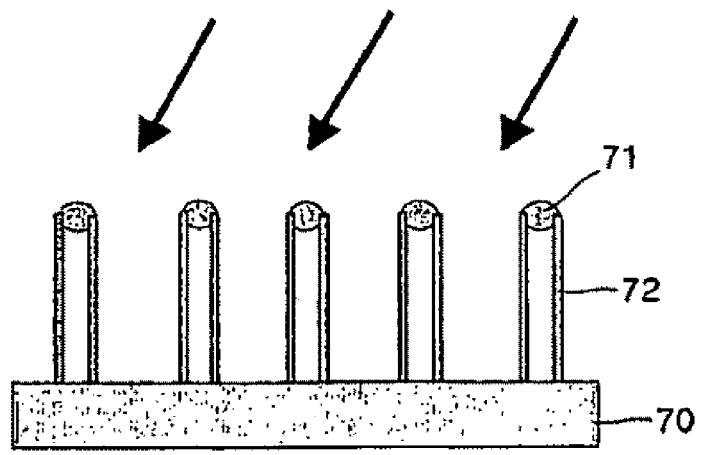
FIGS. 7A through 7C illustrate a process of depositing fuel cell catalyst nanoparticles using an oblique thin film deposition technique according to an embodiment of the present invention.
Figure 7B:
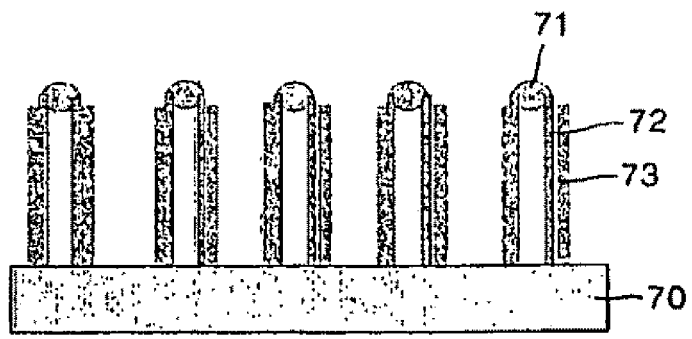
Figure 7C:
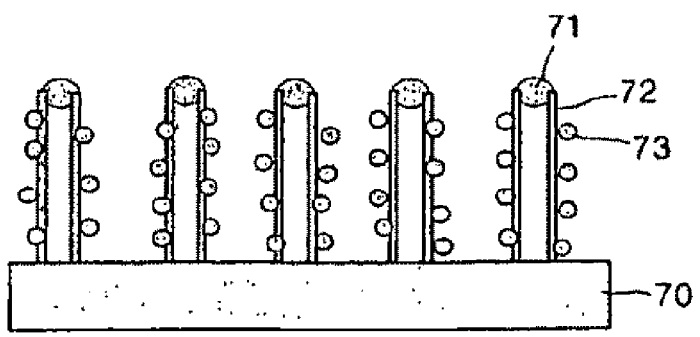

Fuel cell catalyst particle deposition on aligned nanotubes with an average diameter of 30 nm or less may be performed using a dry or semi-dry processing process. An example of depositing the fuel cell catalyst particles on the nanotubes without excessively disturbing their aligned and mutually-separated configuration is an oblique incident thin film deposition method as illustrated in FIGS. 7A through 7C. As illustrated in FIGS. 7A through 7C, an oblique incident deposition of the fuel-cell metallic catalyst (such as Pt, Pd, Rh, Ru and their alloys) by sputtering or evaporation adds the metallic catalyst to the surfaces of aligned primary nanotubes 72 on a substrate 70. The substrate 70 may be the carbon cloth on which the aligned primary nanotubes 72 are formed. Optionally, an interface metal layer (not shown) formed of a metal, such as Ti, Cr or Zr, may be added to the surfaces of the primary nanotubes to enhance adhesion of the fuel cell catalyst to the nanotubes.

The catalyst can be deposited either as a continuous coating film (FIG. 7B) or as isolated particles (FIG. 7C). If a continuous film is deposited as in FIG. 7B, a subsequent heat treatment process at a temperature of 500-900° C. is required to break up the film into the desirable nanoparticle configuration. A tilting movement of the substrate by rotation or rocking of the substrate (or the deposition beam angle) during oblique incident deposition is desired so as to overcome the shadow effect of the carbon fibers and nanotubes near the upper surface on other fibers and nanotubes underneath, and ensure a more uniform metallic catalyst deposition. The movement of the substrate allows metal deposition on as much nanotube surface as possible. Such a substrate motion relative to deposition of the metal atoms can be carried out either in a continuous manner or in an intermittent manner.

3) Supercritical $CO_2$ Deposition

Supercritical $CO_2$ exhibits liquid-like and gas-like properties. Like a liquid, it can dissolve solutes; and like a gas, it possesses low viscosity, high diffusivity and negligible surface tension. Such a supercritical fluid is miscible with gases, and its-solvation power can be adjusted by changing temperature and pressure. These unique properties make supercritical $CO_2$ an attractive medium to alleviate the problem of sluggish mass transfer typically occurring in liquid-phase reactions, thus enabling the precipitation of finer metal nano particles, which is important for fuel cell applications.

Also, with the vapor-like properties, the supercritical $CO_2$ processing allows a delivery of chemical reactants to nanoscale pores or cavities with high aspect ratios, complicated surfaces and poorly wettable substrates, thus enabling a more uniform coverage of surfaces. As compared with the lowvapor-phase precursor concentrations and mass transfer-limited reactions in a chemical vapor deposition process, precursor concentrations in supercritical $CO_2$ can be up to three orders of magnitude greater, therefore a higher reaction rate can be achieved.

In liquid-based chemical reactions, liquid capillary force often causes undesirable damage or change of nanostructural geometrical features such as vertically aligned carbon nanotube configurations. The negligible surface tension of supercritical $CO_2$ also alleviates such a problem, and minimizes disruption of pre-set nano geometry of the substrate. Unreacted materials and by-products from the supercritical $CO_2$ processes can be easily removed from the system by flushing the system with $CO_2$ fluid, and thus high purity reaction products become attainable. In addition, supercritical $CO_2$ is generally nontoxic, unflammable and recyclable, and therefore a liquid waste problem can be minimized. In the present invention, highly dispersed nanoparticles of metallic catalysts are deposited onto the external walls of carbon nanotubes in the aligned carbon nanotube structures through hydrogen reduction of metal precursors dissolved in supercritical $CO_2$. The reaction involves only $H_2$ and metal precursors. Such a simple and "green" nanoparticle deposition technique is not limited to single metal deposition.

According to an embodiment of the present invention, a variety of alloy catalytic metal nanoparticles can also be deposited onto carbon nanotubes by reducing the mixed metal precursors dissolved in supercritical $CO_2$. The loading density of the nanoparticles on the carbon nanotubes is adjustable by changing the amount of metal precursors used.

FIG. 8 schematically illustrates the supercritical fluid system for depositing highly dispersed nanoparticles of metal and metal alloys onto the external sidewalls of carbon nanotubes in the aligned carbon nanotube structures according to an embodiment of the present invention. Most commonly supercritical $CO_2$ is used though other supercritical fluids can also be used.

The supercritical $CO_2$ deposition of catalyst nanoparticles onto carbon nanotubes according to the current embodiment of the present invention is carried out according to the following steps:

(1) One piece of carbon paper substrate grown with the aligned carbon nanotube structures of the present invention is loaded into a high-pressure stainless steel reaction cell along with metal precursors. The metal precursors can be any $CO_2$ soluble compounds of Pd, Pt, Ru, Rh, Ir or their mixtures; (2) 1-8 atom, in particular 3 atm, of hydrogen gas flows through the reaction cell for 5 min to expel the air inside; (3) 60-120 atm, in particular 80 atm, of $CO_2$ is forced into the reaction cell; (4) Seal the reaction cell and leave it undisturbed for 10-60 min, in particular 30 min, to ensure complete dissolution of the precursors in $CO_2$; (5) Heat the reaction cell to the required temperature and keep at this constant temperature for 2-20 min, in particular 5-10 min; and (6) After the reaction, the reaction cell is cooled and vented, and a remaining mixed gas of $CO_2$ and $H_2$ is used to flush the reaction cell twice. A uniform distribution of metallic catalyst nanoparticles on external walls of the carbon nanotubes is achieved.

Figure 9:
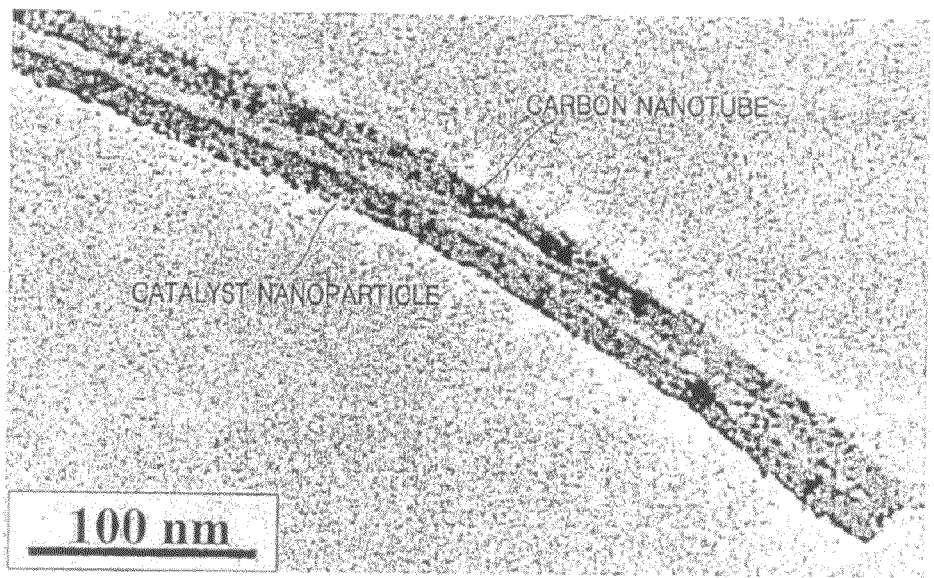
FIG. 9 is a transmission electron microscope (TEM) image of fuel cell catalysts dispersed on a carbon nanotube.

FIG. 9 is a transmission electron microscope (TEM) image of fuel cell catalysts dispersed on a carbon nanotube. Referring to FIG. 9, Ru particles having an average diameter of 2-3 nm are adhered to a nanotube, which demonstrates the capability of the supercritical $CO_2$ fluid deposition.

According to an embodiment of the present invention, supercritical $CO_2$ deposition of Pt nanoparticles onto an aligned carbon nanotube structure grown on carbon paper is carried out using the system illustrated in FIG. 8.

10 mg of a Pt precursor, Pt (II) 2,4-pentanedionate is loaded in a 10 mL high pressure stainless steel reaction cell along with 1 $cm^2$ of carbon paper having vertically aligned carbon nanotubes. The amount of the Pt precursor is in the range of 100-900 parts by weight based on 100 parts by weight of 1 $cm^2$ of carbon paper having vertically aligned carbon nanotubes.

Following precursor loading, the valve V1 is closed while the valves V2, V3 and V4 are opened and 1-8 atm, in particular 3.0 atm, of hydrogen gas is allowed to flow through the system for 2-10 min, in particular about 5 min, to expel the air inside.

After hydrogen loading, the valves V2 and V3 are closed, the reaction cell is evacuated and then the valve V4 is closed while V1 is opened to charge the 100 mL $H_2$—$CO_2$ mixing vessel with 60-120 atm, in particular 80 atm, of $CO_2$. After the $H_2$ and the $CO_2$ is mixed, the valve V3 is opened forcing the mixture into the reaction cell. The valves V1 and V3 are then closed for the dissolution of the precursor in the $CO_2$ solution. To ensure complete dissolution of the Pt-containing compound precursor in supercritical $CO_2$, the reaction cell is left undisturbed for 10-60 min, in particular 30 min. After that, the reaction cell is heated to the desired temperature of 300° C. or less, in particular 100-300° C., and kept at this temperature for 510 min.

Highly dispersed Pt nanoparticles are thus deposited onto surfaces of the carbon nanotubes. After the reaction, the reaction cell is cooled and vented, and the $CO_2$+$H_2$ mixture remaining in the mixing vessel is used to flush the reaction cell twice. The Pt-loaded sample is then retrieved for fuel cell electrode construction.

The Pt particles obtained as described above have an average diameter of 5-10 nm. An area of the carbon nanotubes covered by the Pt particles may be at least 20% of the total surface area of the carbon nanotubes, may be at least 40%, may be at least 60%, and may be or in a range of 70-90%.

When a fuel cell electrode catalyst is Pd, Rh, Ru, Ir, or alloys thereof, instead of Pt, the same method is used except that precursors of these metals are used instead of the Pt precursor.

The Pt precursor may be, in addition to platinum (II) 2,4-pentanedionate, platinum bisacethylacetonate, tetraamminplatium acetate, or the like.

The Pd precursor may be tetraamminepaladium acetate, palladium bisacethylacetonate, or the like. The Rh precursor may be rhodium acetate, rhodium trisacethylacetnate, or the like. The Ru precursor may be ruthenium acetate, ruthenium trisacetylacetnate, or the like. The iridium precursor may be a chloroiridic acid, a chloro biscyclooctine iridium dimmer, or the like.

If the fuel cell catalyst is an alloy of two or more of Pt, Pd, Rd, Ru, and Ir, a mixture of precursors described above can be used.

Such a supercritical $CO_2$ deposition having these characteristics can be applied to, in addition to a predetermined-shaped substrate, carbon powder. According to an embodiment of the present invention, ultra-high-density fuel cell catalyst particles can be loaded onto mesoporus carbon powder using the permeation capability of supercritical $CO_2$ into pores of a carbon substrate, which will now be described in detail.

According to another embodiment of the present invention, supercritical $CO_2$ deposition of Pt nanoparticles onto a mesoporous carbon having mesopores is carried out using the system illustrated in FIG. 8. The mesoporous carbon substrate may have a primary particle average diameter of 500 nm or less, for example 200-350 nm, a pore average diameter of 3-10 nm, and a surface area of 300-3000 $m^2/g$.

10 mg of a Pt precursor, Pt (II) 2,4-pentanedionate is loaded in a 10 mL high pressure stainless steel reaction cell along with 1 $cm^2$ of a mesoporous carbon powder. Following precursor loading, the valve V1 is closed while the valves V2, V3 and V4 illustrated in FIG. 8 are opened and 1-8 atm, in particular 3.0 atm, of hydrogen gas is allowed to flow through the system for 2-10 min, in particular about 5 min, to expel the air inside. The amount of Pt precursor is in the range of 100-200 parts by weight based on 100 parts by weight of the mesoporous carbon powder.

After hydrogen loading, the valves V2 and V3 are closed, the reaction cell is evacuated and then the valve V4 is closed while V1 is opened to charge the 100 mL $H_2$—$CO_2$ mixing vessel with 60-120 atm, in particular 80 atm, of $CO_2$. After the $H_2$ and the $CO_2$ is mixed, the valve V3 is opened forcing the mixture into the reaction cell.

The valves V1 and V3 are then closed for the dissolution of the precursor in the $CO_2$ solution. To ensure complete dissolution of the Pt-containing compound precursor in supercritical $CO_2$, the reaction cell is left undisturbed for 10-60 min, in particular 30 min.

After that, the reaction cell is heated to the desired temperature of 300° C. or less, in particular 100-300° C., and kept at this temperature for 2-20 min, in particular 5-10 min. Highly dispersed Pt nanoparticles are thus deposited onto the mesoporous carbon powder. After the reaction, the reaction cell is cooled and vented, and the $CO_2+H_2$ mixture remaining in the mixing vessel is used to flush the reaction cell twice.

The Pt-loaded sample is then retrieved for fuel cell electrode construction.

4) Reverse Micelle Processing

Figure 17A:
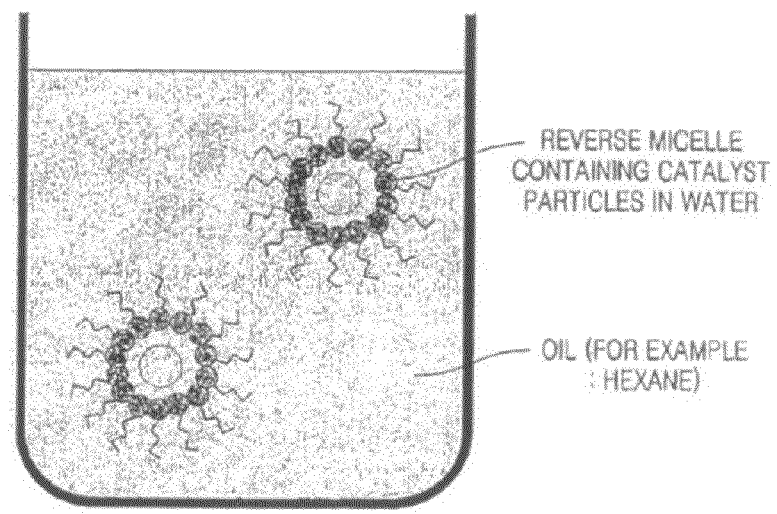
FIGS. 17A through 17C illustrate a method of depositing highly dispersed nanoparticles onto surfaces of aligned and mutually separated carbon nanotubes using a reverse micelle method according to an embodiment of the present invention.
Figure 17B:
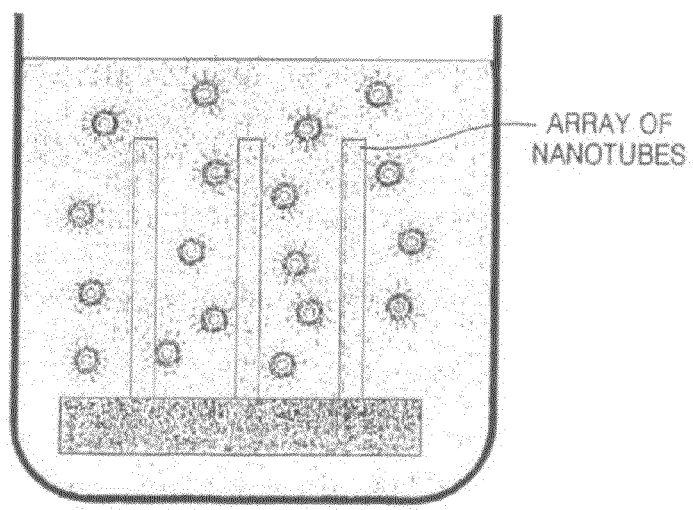
Figure 17C:
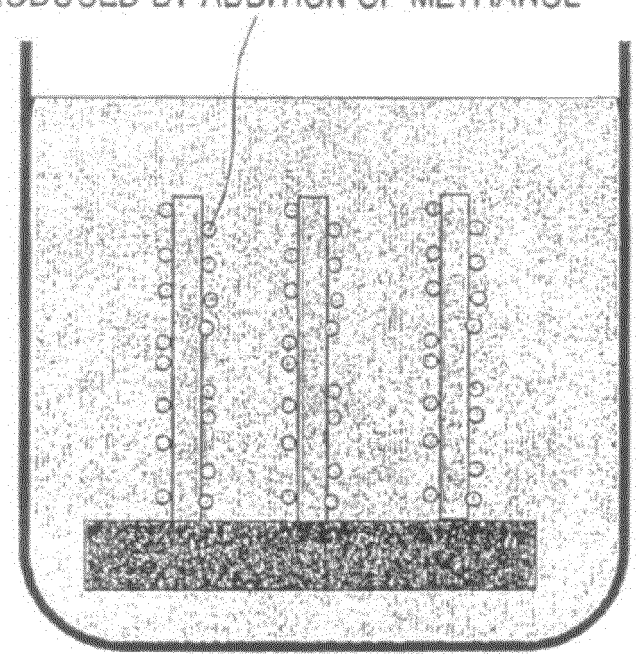

A reverse micelle reaction is based on a colloidal phenomenon of surfactant, which is amphiphilic molecules having both a hydrophilic part which has an affinity for polar solutes, such as water, and a hydrophobic part which includes non-polar solutes such as those formed of hydrocarbons. In a water-in-oil emulsion having a reverse micelle structure, the amphiphilic molecules in a mixture of oil and water self assemble themselves so that hydrophilic heads form a nanoscale or microscale sphere constraining water within, while the hydrophobic tails point outward to the oil matrix as illustrated in FIG. 17A. When such a reverse micelle colloid emulsion is added to aligned carbon nanotubes, and then a chemical reaction is triggered that destroys the reverse micelle structure, the released nanoparticles of fuel-cell catalyst metal stick to outer surfaces of the nanotubes, as illustrated in FIGS. 17B and 17C. In another embodiment of the present invention, a deposition of Pt nanoparticles onto an aligned carbon nanotube structure grown on carbon paper is performed using a water-in-oil microemulsion (reverse micelle) method.

10 mL of hexane, 40.5 µL of a 0.01 M aqueous $PtCl_2$ solution, and 66.7 mg of (0.15 mmol) of bis(2-ethylhexyl) sulfosuccinate (AOT) surfactant are mixed in a round bottomed flask and stirred for 1 hour to give an optically transparent solution with a light yellowish color and a [$H_2O$]/[surfactant] ratio of 15.

The surfactant may be, in addition to AOT, sodium dodecyl sulfonate (SDS), 3-(N,N-dimethyl dodecylammonio propane sulfonate (SB12), or the like. The amount of the surfactant may be in the range of 400000-800000 parts by weight based on 100 parts by weight of the Pt precursor. When the amount of the surfactant is less than 400000 parts by weight, micelle is not sufficiently generated. When the amount of the surfactant is greater than 800000 parts by weight, too many micelles are formed or the water-in-oil emulsion may not be generated. In addition, the spherical structure may be transformed.

To form Pt nanoparticles, the system is first flushed with nitrogen gas followed by passing 1-5 atom, in particular about 1 atom, of hydrogen gas through the system. Hydrogen gas is capable of reducing $Pt^{2+}$ to metallic Pt. A piece of carbon paper with the grown carbon nanotube structures is soaked in the microemulsion containing Pt nanoparticles for 1 minute.

Then, the resulting carbon paper is soaked in methanol or ethanol for 2-10 min, in particular 5 minutes. The methanol or ethanol will destroy the microemulsion structure adsorbed onto the surfaces of the carbon nanotubes and release Pt nanoparticles which are attached to the carbon nanotubes. Such a soaking procedure may be repeated several times to continuously increase the number of attached Pt nanoparticles on the nanotubes until sufficient Pt nanoparticles are added to the carbon nanotube surfaces. The microemulsion solution can be washed away and the nanotubes are dried for construction of fuel cell electrodes. This process is suitable for nanotubes with mechanical stiffness and resistance to agglomeration by wet processing, such as those with a diameter of 30 nm or greater.

Figure 12:
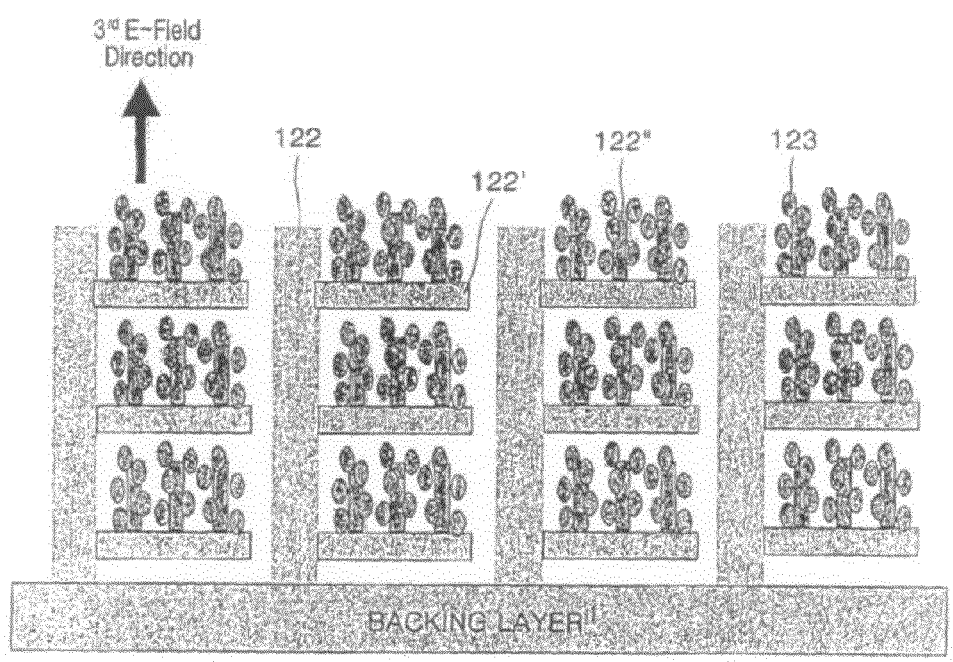
FIG. 12 schematically illustrates a hierarchically assembled nanocomposite structure comprising three, separately grown sequential sets of aligned nanotubes wherein, ultra-high-density fuel cell catalyst nanoparticles are formed on surfaces of nanotubes according to an embodiment of the present invention.

FIG. 12 schematically illustrates a hierarchically assembled nanocomposite structure comprising three, separately grown sequential sets of aligned nanotubes wherein ultra-high-density fuel cell catalyst nanoparticles are formed on surfaces of three set of nanotubes according to an embodiment of the present invention. The orthogonal sets of nanotubes are obtained using three separate nanotube CVD growth steps. As illustrated in FIG. 12, the hierarchically assembled nanocomposite structure includes primary carbon nanotubes 122 which are separated by a predetermined distance from each other and vertically aligned and whose angle of inclination with respect to an orientation axis is 30° or smaller, secondary carbon nanotubes 122' aligned perpendicular to the primary carbon nanotubes 122, and tertiary carbon nanotubes 122" aligned perpendicular to the secondary carbon nanotubes, Fuel cell electrode catalysts 123 are adhered to surfaces of the tertiary carbon nanotubes 122".

The average diameter of the primary carbon nanotubes 122 is in the range of 10-200 nm. The average diameter of the secondary carbon nanotubes 122' is in the range of 3-50 nm. The average diameter of the tertiary carbon nanotubes 122" is in the range of 2-20 nm.

Each step includes plasma CVD with an electric field applied in the intended nanotube growth direction. Such a hierarchial nanotube structure is especially useful in maximizing the empty space between aligned nanotubes. After all the orthogonal sets of hierarchial nanotubes are grown, the fuel-cell catalyst metal nanoparticles are applied onto nanotube surfaces using one of the four inventive deposition techniques described above.

Figure 13:
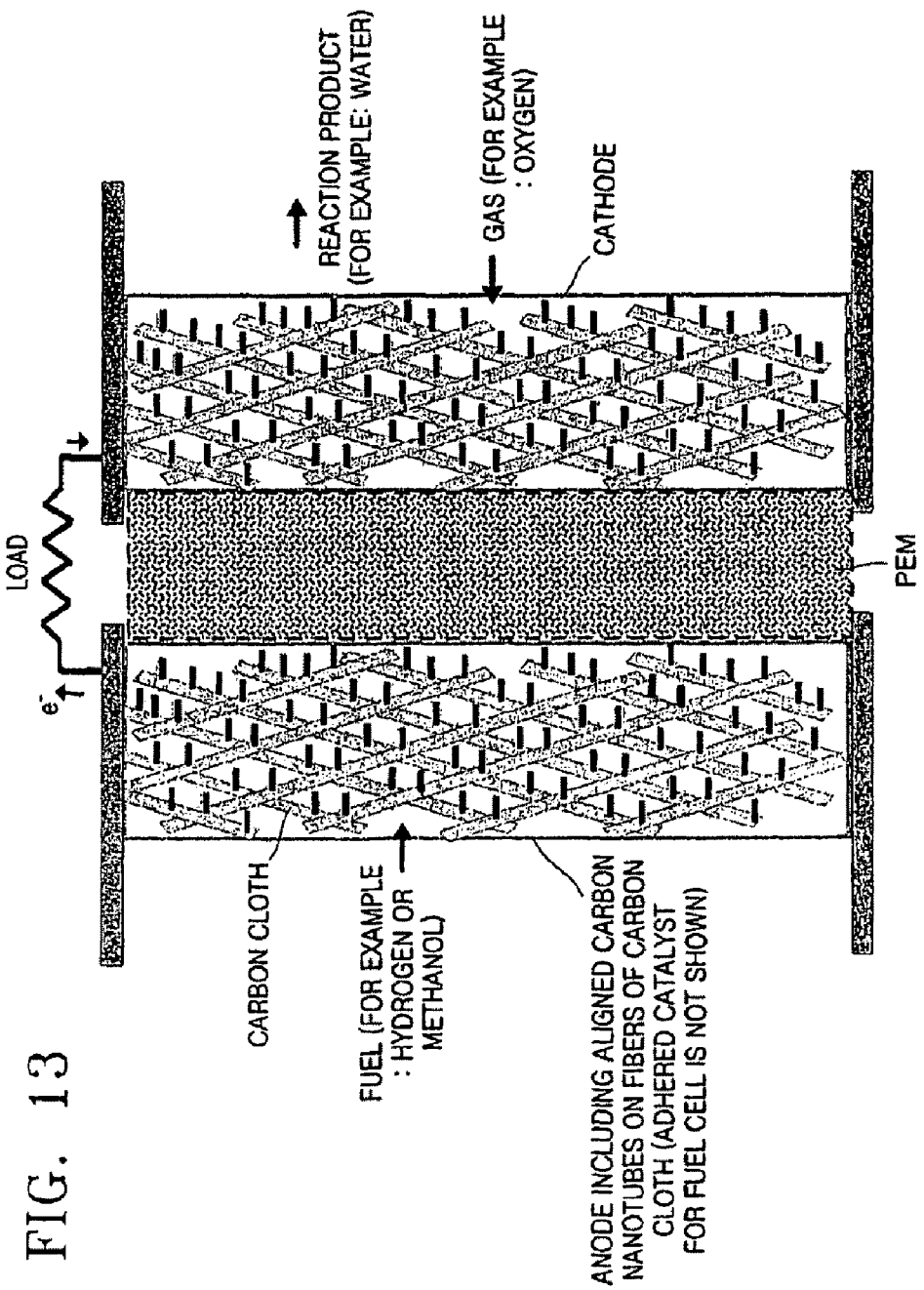
FIG. 13 is a schematic view of a fuel cell according to an embodiment of the present invention.
Figure 14:
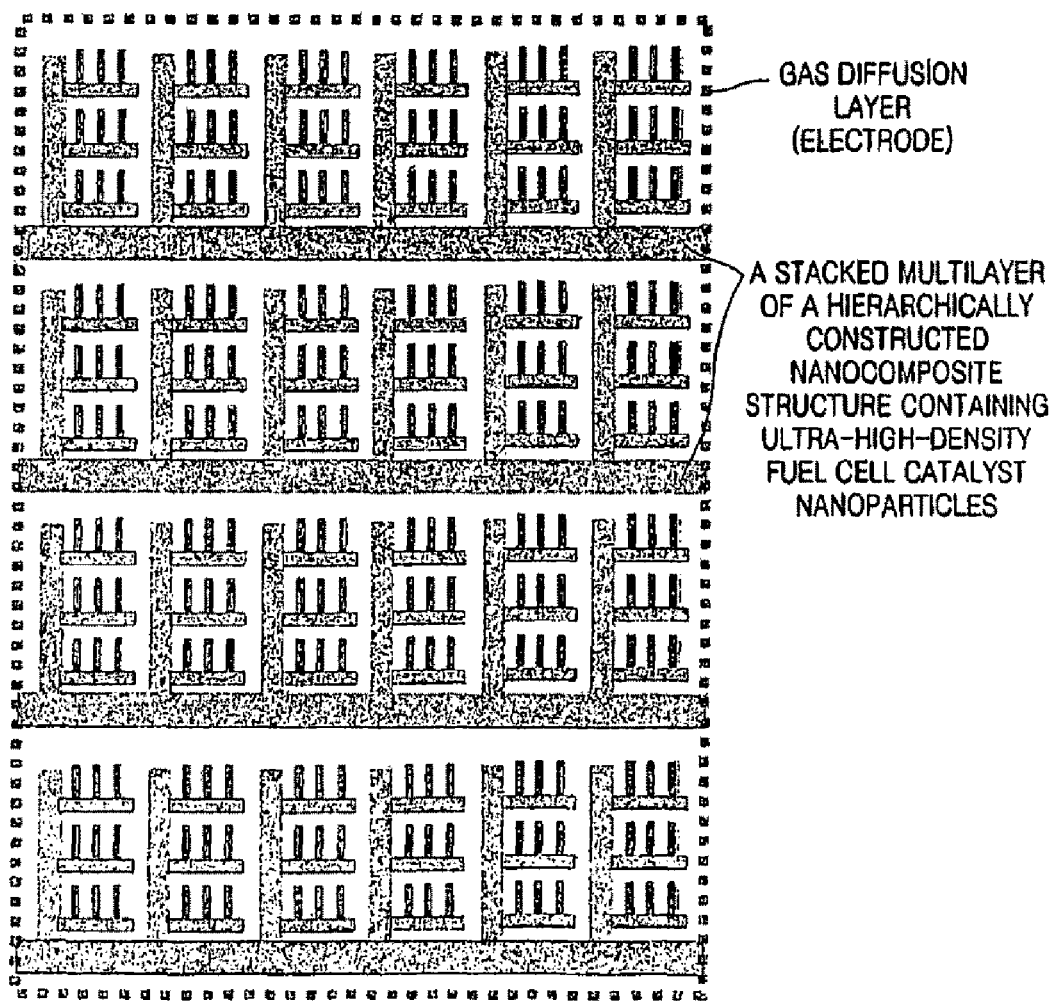
FIG. 14 is a schematic view of a fuel cell electrode assembly comprising a hierarchically constructed stacked multi-player nanocomposite structure containing ultra-high-density fuel cell catalyst nanoparticles on the surfaces of nanotubes having the described structure.

The nanotube structure with ultra-high surface area and ultra-high density catalytic nanoparticles according to the current embodiment of the present invention is then assembled into an electrode assembly sandwiching a proton exchange membrane layer as illustrated in FIG. 13. FIG. 13 schematically illustrates a fuel cell that includes electrodes, each having aligned, mutually separated nanotubes grown in/on carbon fibers in a carbon cloth substrate and dispersed, wherein ultra-high-density fuel cell catalyst nanoparticles are adhered to surfaces of the nanotubes according to an embodiment of the present invention. Each of the carbon fibers in the carbon cloth substrate has a multitude of aligned and mutually-separated nanotubes or a hierarchial nanotube assembly with primary, secondary and possibly tertiary branches which also have fuel-cell catalyst nanoparticles attached to surfaces thereof. A fuel decomposes in the anode and provides electrons to the anode which are collected and sent to an electric circuit as a source of energy. Protons pass through a PEM membrane and go to the cathode where they react with supplied oxygen to form $H_2O$. FIG. 14 illustrates a fuel cell according to another embodiment of the present invention. Referring to FIG. 14, many layers of a triple hierarchial nanotube structure including fuel cell catalyst nanoparticles on surfaces of the carbon nanotubes are stacked together to form a fuel cell electrode assembly.

FIG. 14 illustrates many layers of the triple hierarchial nanotube structure illustrated in FIG. 12 on a planar substrate (such as silicon) stacked together to increase the size and capacity of the fuel cell electrodes.

Instead of the carbon cloth substrates of FIG. 13 or planar substrates of FIG. 14, porous substrates that are formed of micro or macroporous ceramic materials, e.g., micro or macroporous silica, can be used as the substrate material on the surface of which aligned carbon nanotube are grown for high-surface-area and deposition of a large number of ultrafine fuel-cell catalyst nanoparticles according to another embodiment of the present invention. Fabrication of such porous silica materials is described in articles by Shen et al., J. of Phys. Chem. Vol. B108, page 44-51 (2004) and by Kanungo et al., Chem. Communications, page 548-549 (2004). According to the embodiment, the micro or macroporous ceramic material is first (not a word) made conductive before nanotube deposition, in order to provide an electrical conductivity path needed for the electrode material.

Figure 15:
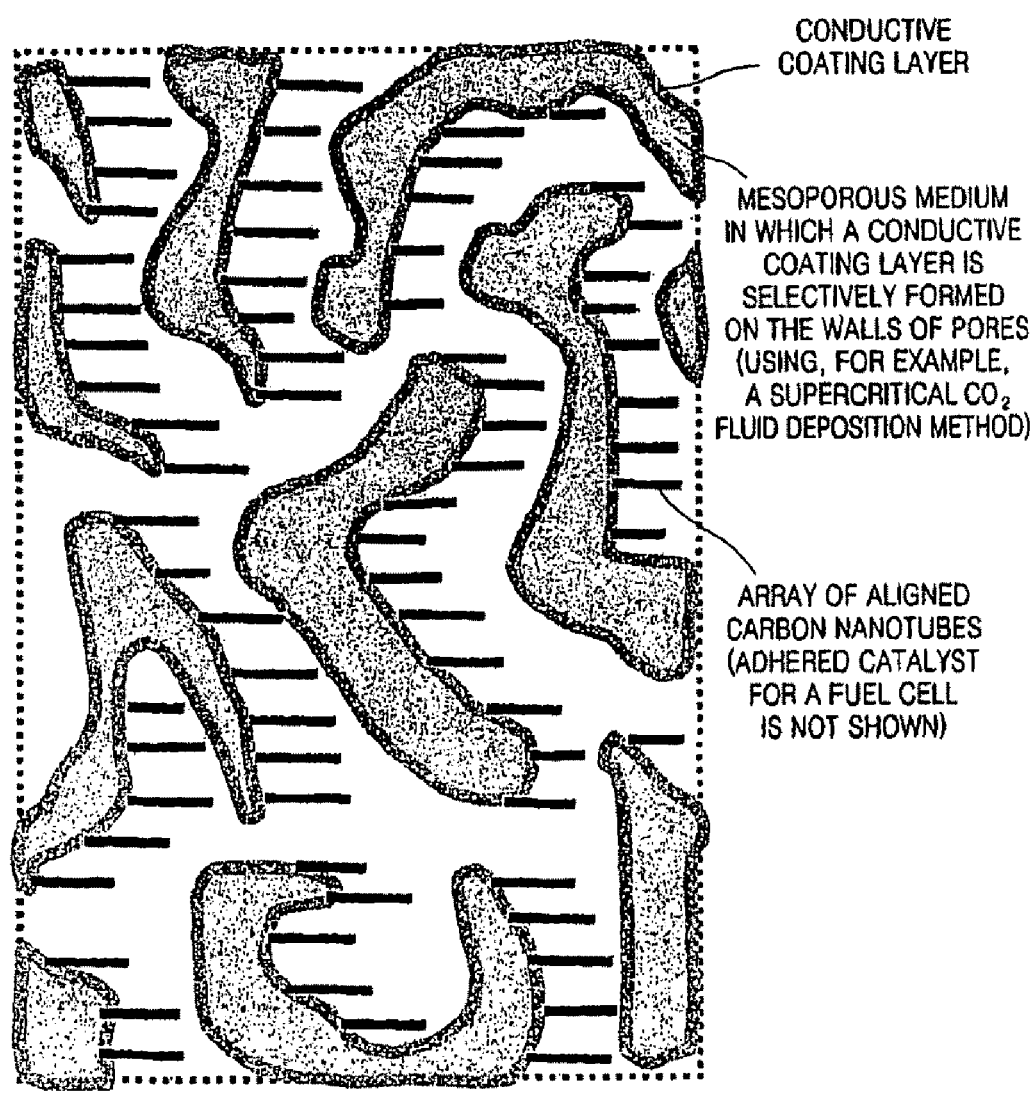
FIG. 15 is a view illustrating an electrode and gas diffusion layer of a fuel cell according to an embodiment of the present invention.

FIG. 15 illustrates a fuel cell electrode and a gas diffusion layer containing ultra-high-density fuel cell catalyst nanoparticles on aligned, mutually separated nanotubes in pores of a conductive mesoporous membrane according to an embodiment of the present invention.

The interior pore surface of the mesoporous material is conductorized with carbon (not a metal), silver, gold, Pt, palladium or copper. To make the mesoporous material conductive, CVD, pore-filling with hydrocarbon-containing polymer followed by combustion, supercritical $CO_2$ deposition, physical vapor deposition, electrolytic or electroless deposition, or a combination of these techniques can be utilized. The thickness of the metal or alloy layer may be at least 100 nm, at least 1 micrometer, 1-3 µm, or 0.1-0.3 µm.

Figure 16:
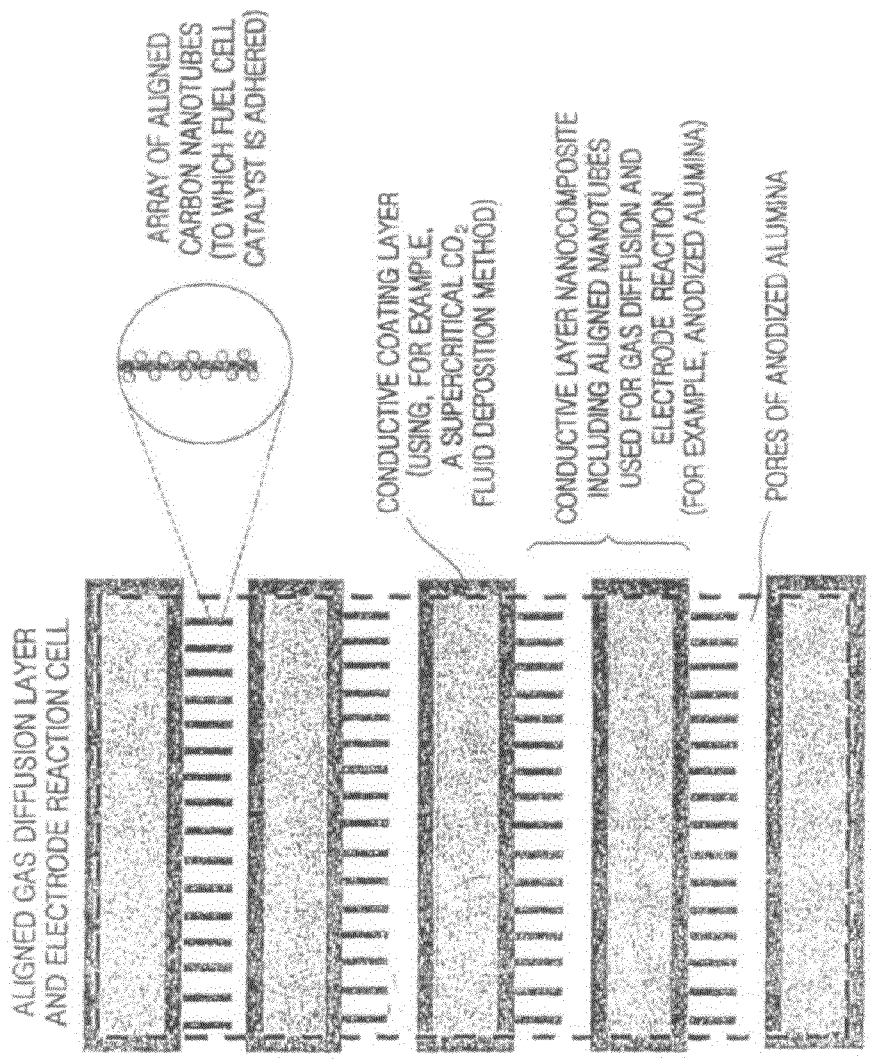
FIG. 16 is a view illustrating an electrode and gas diffusion layer of a fuel cell according to another embodiment of the present invention.

Alternatively, a ceramic or metallic membrane material with aligned pores, such as an anodized aluminum oxide membrane material, can be used as the basis of high-surface-area electrode material as illustrated in FIG. 16. The inside pores are conductorized for required electrical conductivity, prior to the nanotube deposition and fuel-cell catalyst particle loading.

FIG. 16 illustrates a fuel cell electrode and a gas diffusion layer containing ultra-high-density fuel cell catalyst nanoparticles on aligned, mutually separated nanotubes in pores of a conductive membrane aligned in a flow direction of a gas for a fuel cell according to another embodiment of the present invention.

The structures of FIGS. 15 and 16 also advantageously serve as efficient gas diffusion layers for enhanced uniformity and efficiency of fuel cells.

Figure 18:
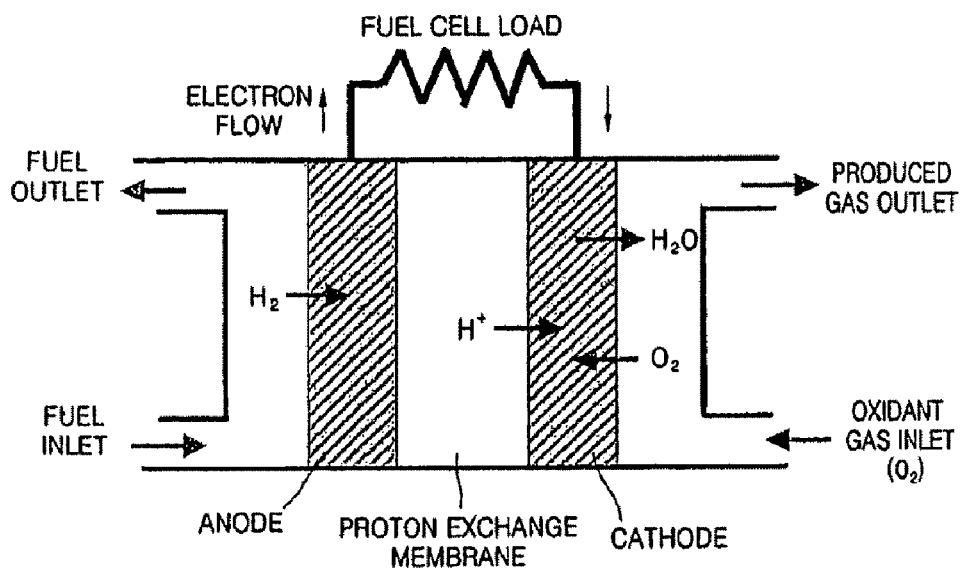
FIG. 18 is a schematic view of a fuel cell including an aligned nanocomposite containing ultra-high-density fuel cell catalyst nanoparticles on surfaces of carbon nanotubes according to an embodiment of the present invention.

FIG. 18 schematically illustrates a fuel cell structure comprising electrodes (anode and cathode) containing aligned nanotubes with ultra-high-surface area and ultrafine catalyst particles for enhanced fuel cell efficiency according to an embodiment of the present invention.

The present invention will be described in further detail with reference to the following examples. These examples are for illustrative purposes only and are not intended to limit the scope of the present invention.

Example 1

Fabrication of Aligned Primary Carbon Nanotubes

Ti was sputtered on carbon paper (total thickness: about 0.5 mm) to form an interface layer Ti with a thickness of about 7 nm, and then without exposure to air, a Ni layer of about 10 nm thickness was formed by sputtering. Then, a DC plasma CVD process was performed to grow carbon nanotubes at 700° C. for 20 min. During the CVD process, an electric field of about 450V was applied to align carbon nanotubes.

A mixed gas of ammonia ($NH_3$) and acetylene ($C_2H_2$) was used in the CVD process, with a total $NH_3$ and $C_2H_2$ pressure maintained at about 3 torr.

Example 2

Electrodeposition of Ni Catalyst

Electrodeposition of Ni particles was performed using a mixed solution of a 45 g/L of $NiCl_2$, 300 g/L of $NiSO_4$ and 45 g/L of $H_3BO_3$ at 20° C. The deposition potential used was −1.2V vs saturated calomel electrode (SCE) produced from Aldrich and the loading was controlled by the total charge applied.

Example 3

Supercritical Fluid Deposition of Ni Particles

A 10 mg of nickel precursor, nickel (II) 2,4-pentanedionate was loaded in the 10 mL capacity high pressure stainless steel reaction cell in which 1 $cm^2$ of carbon paper having the carbon nanotube structure according to the present invention had been placed. Following the precursor loading, the valve V1, illustrated in FIG. 8, was closed while the valves V2, V3 and V4 illustrated in FIG. 8 were opened and hydrogen gas at a pressure of 3.0 atm was allowed to flow through the system for 5 min to expel the air inside.

After hydrogen loading, the valves V2 and V3 were closed to evacuate the reaction cell, and then the valve V4 was closed while V1 was opened to charge the 100 mL $H_2$—$CO_2$ mixing vessel with about 80 atm of $CO_2$. After the $H_2$ and the $CO_2$ were mixed, the valve V3 was opened forcing the mixture into the reaction cell. The valves V1 and V3 were then closed to allow the dissolution of the Ni precursor in the $CO_2$ solution. To ensure complete dissolution, the reaction cell was left undisturbed for 30 minutes.

After that, the reaction cell was heated to a desired temperature of about 250° C., and kept at this temperature for 5-10 min.

As a result of this supercritical fluid deposition, highly dispersed Ni nanoparticles were deposited onto surfaces of carbon nanotubes. After the reaction was completed, the reaction cell was cooled and vented, and the mixture of $CO_2$ and $H_2$ remaining in the mixing vessel was used to flush the reaction cell twice.

Example 4

Electrodeposition of Pt Particles for Fuel Cell

Nanoparticles of Pt were adhered to an aligned carbon nanotube structure grown on carbon paper using a three-electrode dc method and a mixed solution of a 0.9 g/L of $PtCl_2$ and a 52.5 ml/L of HCl at 20° C. The deposition potential used was 0 V vs SCE and the loading was controlled by the total charge applied. By changing the bath solution, potential, current density and deposition time, both the particle size and loading density of Pt can be tuned.

Example 5

Supercritical $CO_2$ Fluid Deposition of Pt Particles for Fuel Cell 10 mg of a Pt precursor, Pt (II) 2,4-pentanedionate was loaded in a/the 10 mL capacity high pressure stainless steel reaction cell in which 1 $cm^2$ of carbon paper having a carbon nanotube structure was placed. Following precursor loading, the valve V1, illustrated in FIG. 8 was closed while the valves V2, V3 and V4 illustrated in FIG. 8 were opened and 3.0 atm of hydrogen gas was allowed to flow through the system for 5 min to expel the air inside. After hydrogen loading, the valves V2 and V3 were closed, the reaction cell was evacuated and then the valve V4 was closed while the valve V1 was opened to charge the 100 mL $H_2$—$CO_2$ mixing vessel with 80 atm of $CO_2$. After mixing of $H_2$ and $CO_2$, the valve V3 was opened forcing the mixture into the reaction cell.

The valves V1 and V3 were then closed for the dissolution of the precursor in the $CO_2$ solution. To ensure complete dissolution of the Pt-containing compound precursor in supercritical $CO_2$, the reaction cell was left undisturbed for 30 min.

After that, the reaction cell was heated to a desired temperature of about 250° C., and kept at this temperature for 5-0 min. Highly dispersed Pt nanoparticles were thus deposited onto surfaces of carbon nanotubes. After the reaction, the reaction cell was cooled and vented, and the mixture of $CO_2$ and $H_2$ remaining in the mixing vessel was used to flush the reaction cell twice.

Figure 20:
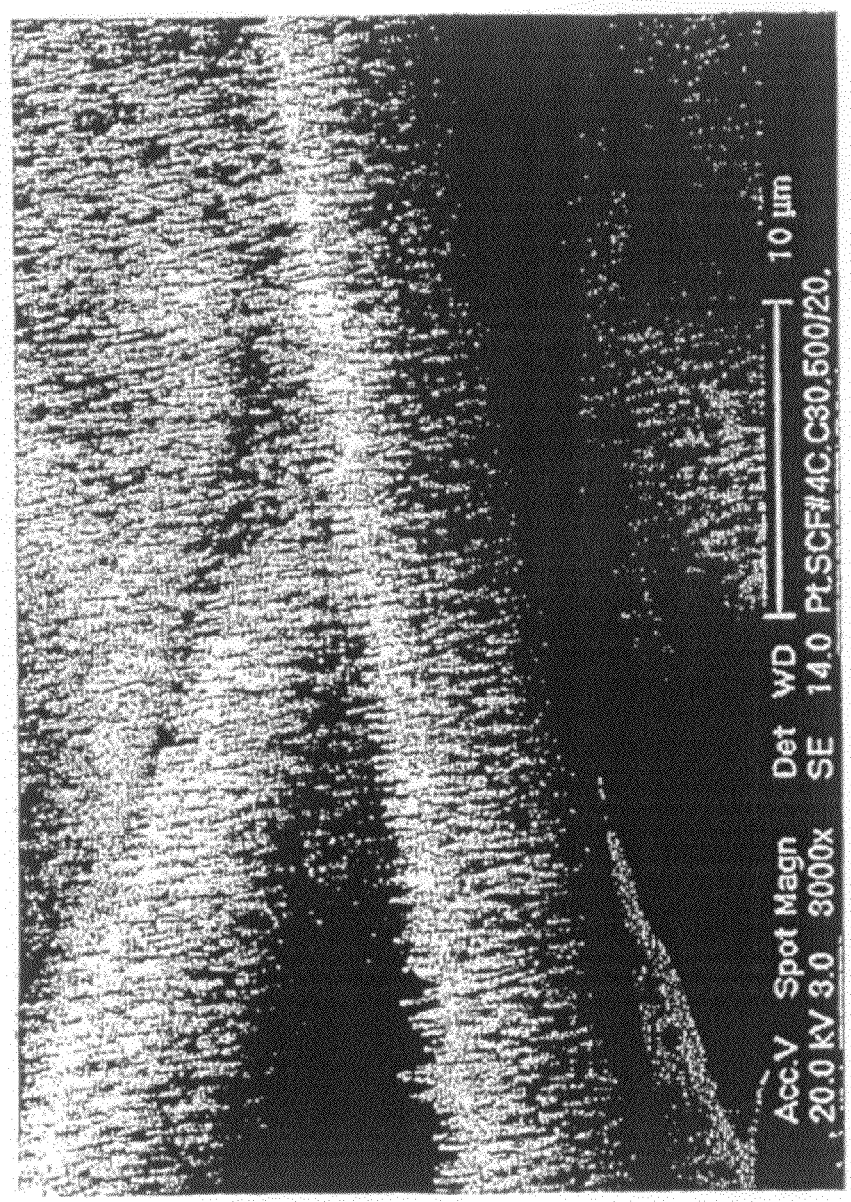
FIG. 20 is a SEM image of a nanocomposite according to an embodiment of the present invention.
Figure 21:
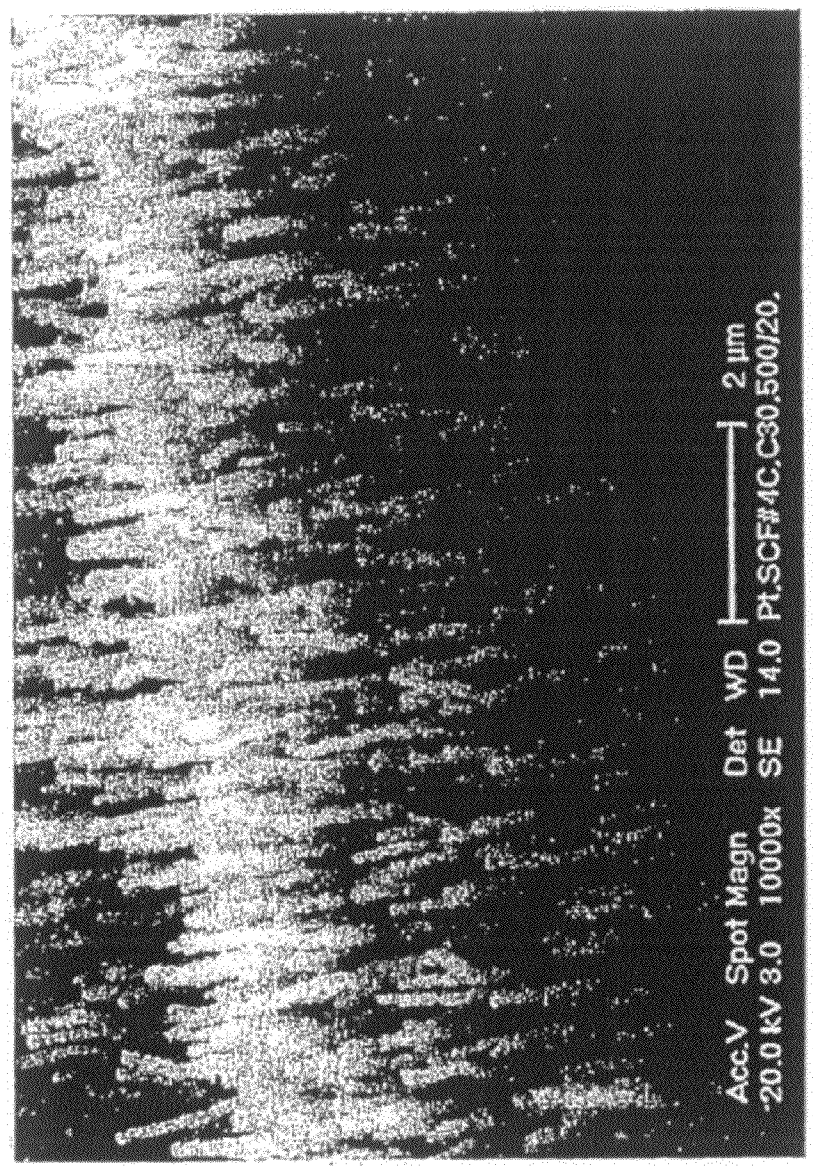
FIG. 21 is a higher magnification SEM image of the nanocomposite of FIG. 20.
Figure 22:
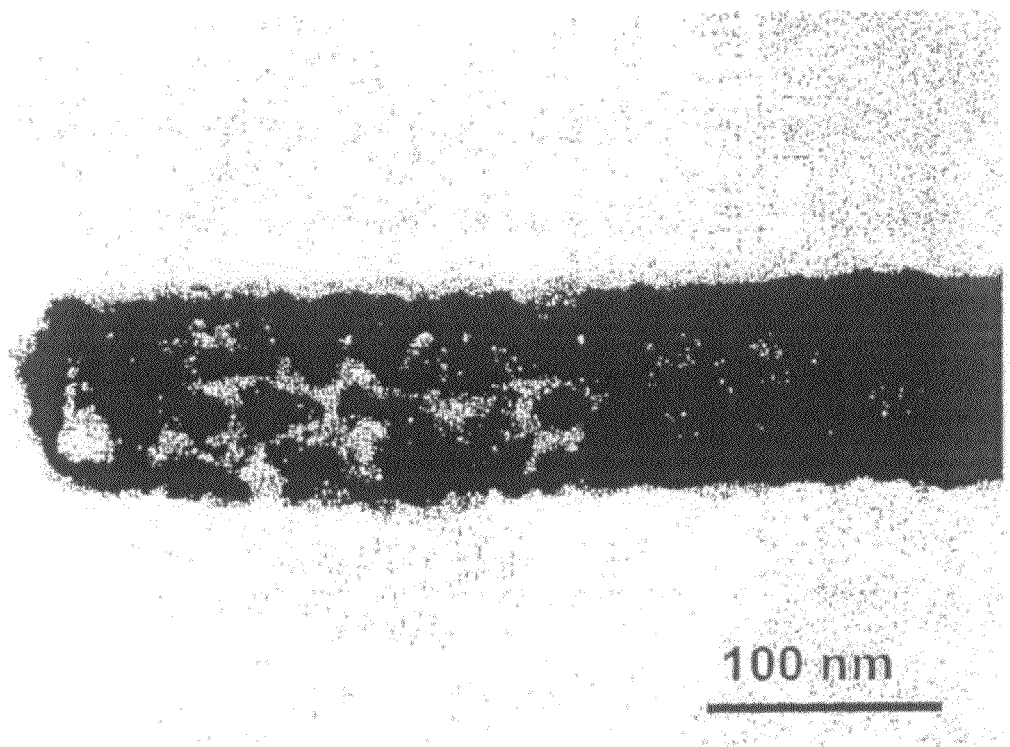
FIG. 22 is a TEM image of a nanocomposite according to an embodiment of the present invention.

SEM images of the nanotubes obtained in the present example are illustrated in FIGS. 20, 21 and 22.

Referring to FIGS. 20 and 21, the carbon nanotubes are aligned and separated. The structure illustrated in FIG. 21 is a magnified SEM image of FIG. 20 (×10,000). Referring to FIG. 22, Pt particles having an average diameter of 3-10 nm cover the external surface of a carbon nanotube.

Example 6

Supercritical $CO_2$ Fluid Deposition 10 mg of a Pt precursor, Pt (II) 2,4-pentanedionate was loaded in the 10 mL capacity high pressure stainless steel reaction cell in which 1 $cm^2$ of a powdered mesoporous carbon support used as a support for a fuel cell catalyst was placed. Following precursor loading, the valve V1 illustrated in FIG. 8 was closed while the valves V2, V3 and V4 illustrated in FIG. 8 were opened and 3.0 atm of hydrogen gas was allowed to flow through the system for 5 min to expel the air inside. After hydrogen loading, the valves V2 and V3 were closed, the reaction cell was evacuated and then the valve V4 was closed while the valve V1 was opened to charge the 100 mL $H_2$—$CO_2$ mixing vessel with 80 atm of $CO_2$. After the $H_2$ and the $CO_2$ were mixed, the valve V3 was opened forcing the mixture into the reaction cell. The valves V1 and V3 were then closed for the dissolution of the precursor in the $CO_2$ solution. To ensure complete dissolution of the Pt-containing compound precursor in supercritical $CO_2$, the reaction cell was left undisturbed for 30 min.

After that, the reaction cell was heated to a desired temperature of about 250° C., and kept at this temperature for 5-10 min. Highly dispersed Pt nanoparticles were thus deposited onto surfaces of carbon nanotubes. After the reaction, the reaction cell was cooled and vented, and the mixture of $CO_2$ and $H_2$ remaining in the mixing vessel was used to flush the reaction cell twice.

Example 7

Reverse Micelle Processing of Pt Particles for Fuel Cell 10 mL of hexane, 40.5 µL of a 0.01 M aqueous $PtCl_2$ solution, and 66.7 mg of (0.15 mmol) of bis(2-ethylhexyl) sulfosuccinate (AOT) surfactant were mixed in a round bottomed flask and stirred for 1 hour to give an optically transparent solution with a light yellowish color and a [$H_2O$]/[surfactant] ratio of 15.

The surfactant may be, in addition to AOT, sodium dodecyl sulfonate (SDS), 3-(N,N-dimethyl dodecylammonio propane sulfonate (SB12), or the like. To make Pt nanoparticles, the system was first flushed with nitrogen gas followed by passing 1 atom of hydrogen gas through the system. Hydrogen gas reduced $Pt^{2+}$ to metallic Pt. A piece of carbon paper with the hierarchical carbon nanotube structures was soaked in the microemulsion containing Pt nanoparticles for 1 minute.

Then, the resulting carbon paper was soaked in methanol for 5 minutes. The methanol destroyed the microemulsion structure adsorbed onto the surfaces of carbon nanotubes and released Pt nanoparticles which were attached to carbon nanotubes. Such a soaking procedure was repeated several times to continuously increase the number of attached Pt nanoparticles on the nanotubes until sufficient Pt nanoparticles were added to the carbon nanotube surfaces. The microemulsion solution was washed away and the resultant were dried for construction of fuel cell electrodes

Example 8

Fabrication of Fuel Cell Electrode

Vertically aligned carbon nanotubes were grown on carbon paper having an entire thickness of 0.5 mm and an area of 9.00 $mm^2$ using a DC plasma process.

A Tl layer of about 7 nm and a Ni layer of about 10 nm were formed on the carbon paper by sputtering, thereby forming a double-layer catalyst layer.

Before the growth of nanotubes, the substrate including the catalyst layer was heated to about 700° C. in an hydrogen atmosphere to break up the Ni layer into isolated nano-islands having an average diameter of 30-150 nm.

A CVD chamber was maintained at a pressure of about $5×10^{-2}$ torr under the hydrogen atmosphere. Ammonia ($NH_3$) gas was added to the chamber to replace hydrogen gas. A DC bias voltage of about 450 V was applied between an anode and a cathode to produce plasma, thereby growing carbon nanotubes with a different morphology. The distance between the anode and the cathode was maintained to be about 1 cm.

Due to the presence of plasma directly on the sample and a smaller thickness of a cathode dark space, the substantial electric field applied to the nanotubes was much greater than a reference electric field (applied voltage) applied between the cathode and the anode.

Then, acetylene gas was provided to the chamber at a total gas (ammonia and acetylene) pressure of about 3 torr, in a fluidity of 30 sccm, thereby growing nanotubes with multi-walls.

The plasma was maintained for 5-20 minutes so that nanotubes were grown to a length of 0.5-2 μm on carbon micro fibers.

The aligned carbon nanotubes on the carbon paper, 20 mg of $Pt(acac)_2$ (herein, acac is an acronym of acetylacetonate) was added as a metal precursor, a small amount of methanol was loaded in a high pressure reaction cell located in an oven. 10 bar of hydrogen gas was provided to the cell for 5 minutes.

Then, 80 bar of $CO_2$ gas was provided to the cell, and the result was heated to 50° to produce a supercritical fluid for 1 hour. When the precursor was completely dissolved in the supercritical $CO_2$, the reaction cell was heated to 200° C. The reduction from $pt^{+2}$ to Pt occurred quickly within 30 minutes.

The pressure applied to the reaction cell was reduced and the cell was flushed with high purity $CO_2$ twice. Then, the aligned carbon nanotubes loaded with Pt nanoparticles having an average diameter of about 8 nm were separated from the cell, thereby producing an electrode in which Pt particles are adhered onto the aligned carbon nanotubes.

COMPARATIVE EXAMPLE 1

Fabrication of Electrodes

5% by weight of Nafion aqueous solution was diluted to prepare a 0.5% by weight of Nafion solution. Catalyst powder was ultrasonic homogenized in the 0.5% by weight of Nafion solution to prepare a back homogenous suspension of 1 mg/ml Pt-CNT. 5 μL of the back homogenous suspension was applied to the surface of a carbon electrode (BAS, West Lafayette, Ind.) having a diameter of 3 mm, and the result was dried to produce an electrode.

Figure 19:
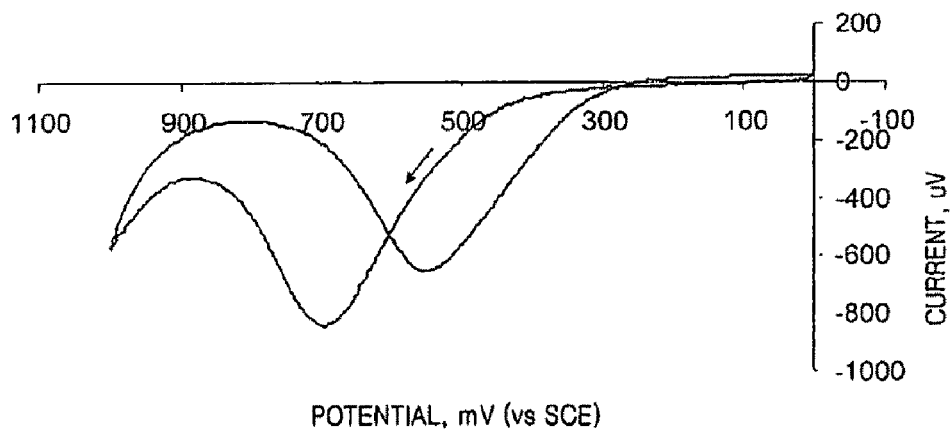
FIG. 19 illustrates cyclic voltametry results of a fuel cell according to Example 8.

The activities of an electric catalyst of the electrodes of Example 8 and Comparative Example 1 in a methanol oxidation reaction were measured using cyclic voltametry. The results are illustrated in FIG. 19. Cyclic voltametry was performed using a 1M sulfuric acid and 2M methanol aqueous solution. Cyclic voltametry scans were performed from 0 to 1.0 V at a scan rate of 50 mV/s.

As a result, the initial voltage of methanol oxidation of Example 8 was 0.35 V, its peak voltage was 0.7V and the peak current was about 800 mA, 6 times that of Comparative Example 1. That is, it was found that the current density was much greater when carbon nanotubes are aligned to maximize available surface area to increase the use of fuel cell catalysts loaded on the carbon nanotubes than when carbon nanotubes are randomly aligned. Therefore, it would be easily expected that a fuel cell including an electrode having oriented and aligned carbon nanotubes would perform better.

Carbon nanotubes for a fuel cell according to the present invention are separated by a predetermined distance from each other, and aligned. Such carbon nanotubes have a larger surface area than conventional carbon nanotubes. Therefore, ultra-high-density nanoparticles of metallic catalyst can be uniformly deposited on external sidewall surfaces of the carbon nanotubes, which form a nanocomposite. A fuel cell including the nanocomposite exhibits higher reaction efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of producing a nanocomposite for a fuel cell, the method comprising:
   depositing a carbon nanotube-nucleating catalyst layer on a porous backing substrate;
   heating the catalyst layer to 500-900° C. to break the catalyst layer into isolated nano-islands;
   growing vertically aligned, mutually separated carbon nanotubes using a plasma chemical vapor deposition process using a carbonaceous source gas and application of a predetermined electric field in the range of 200-800 volts, wherein an angle of inclination of the carbon nanotubes with respect to an orientation axis is 30° or less;
   adhering new carbon nanotube-nucleating catalyst onto sidewall surfaces of the vertically aligned, mutually separated primary carbon nanotubes by the method selected from the group consisting of sputtering and evaporation, at an oblique angle; and
   applying a predetermined electric field in the range of 200-800 volts to the carbon nanotube-nucleating catalyst covered primary carbon nanotubes, to grow aligned, mutually separated secondary carbon nanotubes on the primary carbon nanotubes in a direction in which the electric field is applied, wherein the secondary carbon nanotubes are grown perpendicularly to the primary carbon nanotubes, or at an angle of inclination with respect to an axis perpendicular to the primary carbon nanotubes of 80° or less.

2. The method of producing a nanocomposite for a fuel cell of claim 1, when the backing substrate is formed of carbon fibers, further comprising an interface layer interposed between the backing substrate and the nucleating catalyst layer, formed of at least one material selected from a group consisting of Ti, Cr, Zr, Hf, Mo, and Ta which is deposited first on the carbon fiber backing substrate and then the nucleating catalyst is deposited on the interface layer to retain the nucleating catalyst on the fiber surface.

3. The method of producing a nanocomposite for a fuel cell of claim 1 wherein the backing substrate consists of woven or stack-assembled carbon fibers.

4. The method of producing a nanocomposite for a fuel cell of claim 3 wherein the diameter of the carbon fibers are 50 μm or smaller.

* * * * *